US010513999B2

(12) United States Patent
Uchida et al.

(10) Patent No.: US 10,513,999 B2
(45) Date of Patent: Dec. 24, 2019

(54) ENGINE CONTROLLER

(71) Applicant: TOYOTA JIDOSHA KABUSHIKI KAISHA, Toyota-shi, Aichi-ken (JP)

(72) Inventors: Daisuke Uchida, Gotenba (JP); Motonari Yarino, Sunto-gun (JP); Susumu Hashimoto, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 122 days.

(21) Appl. No.: 14/916,059

(22) PCT Filed: Sep. 2, 2014

(86) PCT No.: PCT/IB2014/001669
§ 371 (c)(1),
(2) Date: Mar. 2, 2016

(87) PCT Pub. No.: WO2015/033200
PCT Pub. Date: Mar. 12, 2015

(65) Prior Publication Data
US 2016/0208730 A1 Jul. 21, 2016

(30) Foreign Application Priority Data
Sep. 4, 2013 (JP) .................................. 2013-183115

(51) Int. Cl.
*F02D 41/34* (2006.01)
*F02D 41/40* (2006.01)
(Continued)

(52) U.S. Cl.
CPC .............. *F02D 41/345* (2013.01); *F02B 5/02* (2013.01); *F02B 75/12* (2013.01); *F02D 35/027* (2013.01);
(Continued)

(58) Field of Classification Search
CPC .... F02D 41/345; F02D 41/405; F02D 41/401; F02D 35/027; F02D 2200/025;
(Continued)

(56) References Cited

U.S. PATENT DOCUMENTS 4,359,032 A    11/1982   Ohie
5,163,405 A *  11/1992   Ahern ................... F02D 35/027
                                                              123/435
(Continued)

FOREIGN PATENT DOCUMENTS

DE              19908729 A1    9/2000
DE       10 2010 029 728 A1    3/2011
(Continued)

*Primary Examiner* — Joseph J Dallo
*Assistant Examiner* — Kurt Philip Liethen
(74) *Attorney, Agent, or Firm* — Finnegan, Henderson, Farabow, Garrett & Dunner, LLP

(57) ABSTRACT

An engine controller according to one aspect of the invention is applied to a cylinder injection engine including a fuel injection valve that directly injects fuel into a cylinder. The engine controller determines whether knocking is occurring based on a signal from a knocking sensor. When the knocking is occurring, the engine controller performs partial lift fuel injection at a predetermined timing close to an ignition timing. The partial lift fuel injection is performed with a lift amount of a valve body of the fuel injection valve limited within a range between a minimum lift amount (0) and a partial lift amount, which is smaller than a maximum lift amount.

8 Claims, 15 Drawing Sheets

(51) Int. Cl.
*F02D 35/02* (2006.01)
*F02B 5/02* (2006.01)
*F02B 75/12* (2006.01)

(52) U.S. Cl.
CPC ......... *F02D 41/401* (2013.01); *F02D 41/405* (2013.01); *F02B 2075/125* (2013.01); *F02D 2200/025* (2013.01); *F02D 2200/063* (2013.01); *Y02T 10/44* (2013.01)

(58) Field of Classification Search
CPC ...... F02D 2200/063; F02B 75/12; F02B 5/02; F02B 2075/125; Y02T 10/44
See application file for complete search history.

(56) References Cited

U.S. PATENT DOCUMENTS

| | | | | |
|---|---|---|---|---|
| 5,865,153 | A * | 2/1999 | Matsumoto | F02B 23/104 123/299 |
| 6,505,603 | B1 | 1/2003 | Schray et al. | |
| 7,000,600 | B1 * | 2/2006 | Yamada | F02D 41/40 123/494 |
| 7,021,278 | B2 * | 4/2006 | Ishizuka | F02D 41/1401 123/299 |
| 7,246,600 | B2 * | 7/2007 | Nakashima | F02D 35/027 123/435 |
| 7,415,348 | B1 * | 8/2008 | Ramappan | F02D 41/402 123/299 |
| 2003/0089334 | A1 | 5/2003 | Yomogida | |
| 2005/0205052 | A1 | 9/2005 | Blessing et al. | |
| 2011/0079198 | A1 | 4/2011 | Moessner et al. | |
| 2012/0029789 | A1 * | 2/2012 | Mehta | F02D 35/023 701/103 |

FOREIGN PATENT DOCUMENTS

| | | |
|---|---|---|
| JP | 63-27538 B2 | 6/1988 |
| JP | 2003-21024 | 1/2003 |
| JP | 2010-24993 | 2/2010 |
| JP | 2011-111921 | 6/2011 |
| JP | 2013100727 A * | 5/2013 |

* cited by examiner

ENGINE CONTROLLER

CROSS-REFERENCE TO RELATED APPLICATIONS

This application is a national phase application of International Application No. PCT/IB2014/001669, filed Sep. 2, 2014, and claims the priority of Japanese Application No. 2013-183115, filed Sep. 4, 2013, the content of both of which is incorporated herein by reference.

BACKGROUND OF THE INVENTION

1. Field of the Invention

The invention relates to an engine controller applied to an internal combustion engine including a direct fuel injection valve.

2. Description of Related Art

Conventionally, internal combustion engines including a fuel injection valve that directly injects fuel into a cylinder (hereinafter, also referred to as "direct injection valve"), have been widely available. Such an engine is also referred to as "cylinder fuel injection internal combustion engine", "direct injection engine", or "cylinder injection engine". In the direct injection engine, knocking might be caused by a large engine load. When the knocking occurs, a conventional engine controller retards an ignition timing and an opening timing of an intake valve to control the occurrence of the knocking (see, for example, Japanese Patent Application Publication No 2011-111921 (JP 2011-111921 A)).

SUMMARY OF THE INVENTION

Unfortunately, fuel efficiency might largely degrade when the ignition timing is retarded. Thus, the invention provides an engine controller capable of controlling the knocking in the direct injection engine without largely degrading the fuel efficiency. To achieve this, the engine controller additionally performs fuel injection with an adjusted range of movement of a valve body, which is generally a needle valve (a lift amount of the valve body, which is generally a needle lift amount) of the fuel injection valve.

An engine controller of the invention (hereinafter, also referred to as "inventive device") is applied to an internal combustion engine (a direct injection engine for example) including a cylinder defining "a combustion chamber in which a fuel injection valve is disposed in such a manner that an injection hole (fuel injection hole) of the fuel injection valve is exposed, and which is opened and closed by the intake valve and the exhaust valve". The fuel injection valve includes a valve body. The valve body at a sitting position closes the fuel injection hole so that the fuel injection is stopped. The movement amount (that is, the lift amount) of the valve body from the sitting position is changeable within a range of up to a maximum lift amount (full lift amount).

The inventive device includes a controller that changes the lift amount of the valve body to perform the fuel injection from the fuel injection valve before the ignition timing.

The controller determines whether a request to control the knocking (anti-knocking request) is in effect. Upon determining that the request is in effect, the controller performs fuel injection at a predetermined timing close to the ignition timing, after the fuel injection performed before the ignition timing. The fuel injection is performed with the lift amount changed within a range of up to "a partial lift amount smaller than the maximum lift amount". Such a fuel injection (performed with the lift amount changed within the range of up to the partial lift amount) is referred to as "partial lift fuel injection" or "partial lift injection". The fuel injection performed with the lift amount changed within the range of up to the maximum lift amount is also referred to as "full lift fuel injection, full lift injection, or maximum lift injection".

The knocking is caused by autoignition of unburned gas (air-fuel mixture) compressed by combustion gas. Thus, the knocking is likely to occur in a portion, in the combustion chamber, where a combustion speed of the unburned gas is low. The injected fuel spray maximum travel distance is shorter with the partial lift fuel injection than with the full lift fuel injection. In other words, penetration force of the fuel spray formed by the partial lift fuel injection is small. Thus, when the partial lift fuel injection is performed at an appropriate timing close to the ignition timing (close to a compression top dead center for example), the fuel spray can be formed in a predetermined portion (a portion in which the combustion speed is low) in the combustion chamber. In the portion where the fuel spray is formed, a flame propagation speed is high. As a result, the unburned gas, which causes the knocking, burns quickly, and thus has a less chance to be compressed by the combustion gas. Furthermore, the fuel, by being burned, injected at timing close to the ignition timing, contributes to torque generation. As a result, the knocking can be effectively controlled without largely degrading the fuel efficiency. The partial lift fuel injection, which may be performed after the ignition timing, could be effective to control the knocking also when it is performed before the ignition timing.

In an aspect of the inventive device, the controller is Configured to consecutively perform the partial lift fuel injection for a plurality of times upon determining that the request (anti-knocking request) is in effect.

By thus consecutively performing the partial lift fuel injection for a plurality of times, the fuel spray can continuously be formed at a target position. Thus, the aspect described above can more effectively control the knocking by the partial lift fuel injection.

In an aspect of the inventive device, the controller includes a knocking detector that detects the knocking. The controller is configured to determine that the request (anti-knocking request) is in effect when the knocking detector detects the knocking.

The knocking detector may include at least one of sensors including a knocking sensor (knock sensor), a cylinder pressure sensor, and an ion probe, for example.

Generally, a temperature inside the combustion chamber is higher in an exhaust valve adjacent area (hereinafter, also referred to as "exhaust valve side") in which hot exhaust gas passes, than in an intake valve adjacent area (hereinafter, also referred to as "intake valve side") through which cold air flows. When "tumble flow from the intake valve side to the exhaust valve side" is generated by air intake, the flame first reaches the exhaust valve side in the combustion chamber. Thus, the unburned gas on the intake valve side is likely to be compressed by the combustion gas (flame). All things considered, generally, the knocking is likely to occur on the intake valve side in the combustion chamber. However, depending on an engine load and/or the engine rotation speed, "tumble flow traveling from the exhaust valve side to the intake valve side along a piston crown plane" might be generated. When such a tumble flow is generated, the flame first reaches the intake valve side. Thus, the unburned gas on the exhaust valve adjacent to the piston crown plane is compressed. As a result, the knocking might occur in such a portion (specifically, the exhaust valve side of in the combustion chamber).

The spray maximum travel distance is shorter with partial lift fuel injection with a relatively small partial lift amount (hereinafter, also referred to as "first partial lift fuel injection" or "intake valve side partial lift fuel injection") than with partial lift fuel injection with a relatively large partial lift amount (hereinafter, also referred to as "second partial lift fuel injection" or "exhaust valve side partial lift fuel injection").

Thus, in a configuration where the fuel injection valve injects fuel toward the exhaust valve side from the intake valve side in the combustion chamber, the fuel spray can be formed on the intake valve with the first partial lift fuel injection, and can be formed on the exhaust valve side with the second partial lift fuel injection. The fuel spray formed on the intake valve increases the combustion speed of the unburned gas on the intake valve side, and thus can effectively control the knocking occurring on the intake valve side. the fuel spray formed on the exhaust valve increases the combustion speed of the unburned gas on the exhaust valve side, and thus can effectively control the knocking occurring on the exhaust valve side.

Thus, the controller in one aspect of the inventive device includes the knocking detector, and the controller is configured to perform the following operations upon detecting that the request (anti-knocking request) is in effect (that is, when the knocking detector detects the knocking). First, (1) the controller performs, as the partial lift fuel injection, the first partial lift fuel injection with the partial lift amount set to a first lift amount, to form the fuel spray on the intake valve side in the combustion chamber. Then, (2) when the knocking is still detected by the knocking detector even when the first) partial lift fuel injection is being performed, the controller performs, as the partial lift fuel injection, the second partial lift fuel injection with the partial lift amount set to "a second lift amount larger than the first lift amount" to form the fuel spray on the exhaust valve side in the combustion chamber. The second lift amount is smaller than the maximum lift amount.

As described above, when the knocking is detected, the first partial lift fuel injection is first performed to control the knocking on the intake valve side, where the knocking has a higher chance to occur. Then, when the knocking is still detected even when the first partial lift fuel injection is being performed, the knocking is likely to be occurring on the exhaust valve side. Thus, the second partial lift fuel injection is performed to control the knocking occurring on the exhaust valve side. All things considered, by selectively using the first partial lift fuel injection and the second partial lift fuel injection, the knocking can be effectively controlled, without identifying whether the knocking is occurring on the intake valve side or on the exhaust valve side in the combustion chamber.

When the fuel injection valve is configured to inject the fuel toward the exhaust valve side from the intake valve side in the combustion chamber, the controller in one aspect of the inventive device includes a knocking identification unit that determines whether the knocking is occurring, and further identifies whether the knocking is occurring on the intake valve side or on the exhaust valve side in the combustion chamber. In this configuration, (1) the controller determines that the request (anti-knocking request) is in effect when the knocking identification unit identifies that the knocking is occurring on the intake valve side in the combustion chamber. Then, the controller performs, as the partial lift fuel injection, the first partial lift fuel injection with the partial lift amount set to the "first lift amount", to form the fuel spray on the intake valve side in the combustion chamber. Furthermore, (2) the controller determines that the request (anti-knocking request) is in effect when the knocking identification unit identifies that the knocking is occurring on the exhaust valve side in the combustion chamber. Then, the controller performs, as the partial lift fuel injection, the second partial lift fuel injection with the partial lift amount set to "the second lift amount larger than the first lift amount" to form the fuel spray on the exhaust valve side in the combustion chamber.

According to this aspect, the knocking occurring on the intake valve side can be immediately controlled by the first partial lift fuel injection, and the knocking occurring on the exhaust valve side can be immediately controlled by the second partial lift fuel injection. Whether the knocking is occurring on the intake valve side or the exhaust valve side can be easily identified based on signals from a cylinder pressure sensor or an ion probe disposed on each of the intake valve side and the exhaust valve side.

A controller, in one aspect of the inventive device, is configured to determine that the request (anti-knocking request) is in effect when an operation state of the engine is "a predetermined operation state where the knocking needs to be controlled". The determination requires no processing such as setting a determination flag, for example. Specifically, in this aspect, the partial lift fuel injection is performed when the operation state of the engine is "the predetermined operation state where the knocking needs to be controlled". The predetermined operation state includes, for example, a state where an engine load is equal to or larger than "a constant or variable threshold load" and a state where an operation state, determined by the engine load and an engine rotation speed, is within a predetermined operation region.

In this configuration; the knocking can be controlled by the partial lift fuel injection.

When the fuel injection valve is configured to inject the fuel toward the exhaust valve side from the intake valve side in the combustion chamber, the controller in one aspect of the inventive device performs the following operations. Specifically, (1) the controller determines that the request (anti-knocking request) is in effect, when the operation state of the engine is a first predetermined operation state where the knocking needs to be controlled. Then, the controller performs, as the partial lift fuel injection, the first partial lift fuel injection with the partial lift amount set to the first lift amount, to form the fuel spray on the intake valve side in the combustion chamber. Furthermore, (2) the controller determines that the request (anti-knocking request) is in effect, when the operation state of the engine is a second predetermined operation state where the knocking needs to be controlled on the exhaust valve side in the combustion chamber. Furthermore, the controller performs, as the partial lift fuel injection, the second partial lift fuel injection with the partial lift amount set to the second lift amount larger than the first lift amount, to form the fuel spray on the exhaust valve side in the combustion chamber.

According to this aspect, the occurrence of knocking can be controlled on the intake valve side by the first partial lift fuel injection and can be controlled on the exhaust valve side by the second partial lift fuel injection, without identifying the occurring position of the knocking. in this case also, the determination on whether the anti-knocking request is in effect requires no processing such as the setting of the determination flag, for example. Specifically, in this aspect, when the operation state of the engine is "the predetermined operation state where the knocking needs to be controlled on the intake valve side and the exhaust valve side in the combustion chamber", the partial lift fuel injection of a corresponding type is performed.

The knocking has a higher chance to occur with a larger air-fuel ratio of the air-fuel mixture (with a leaner air-fuel mixture).

Thus, a controller in one aspect of the inventive device is configured to increase the number of times the partial lift fuel injection is performed at timing close to the ignition timing as the air-fuel ratio of the air-fuel mixture supplied to the engine increases.

Thus, the knocking can be effectively controlled without performing the partial lift fuel injection more than necessary even when the air-fuel ratio of the air-fuel mixture fluctuates.

In one aspect of the inventive device, the fuel injection valve is configured in such a manner that a center axis of the fuel spray formed by the fuel injected from the fuel injection hole substantially matches a center line between two intake valves formed on an upper wall surface of the cylinder, in plan view of the cylinder.

Furthermore, the fuel injection valve in one aspect of the inventive device may be configured in such a manner that the fuel injection hole is in the form of a slit, and a geometric area of the fuel injection hole is larger at a portion closer to the fuel outlet side and farther from the fuel inlet side. The fuel injection valve may be disposed in such a manner that the fuel injection hole is exposed at an outer circumference portion of an upper wall surface of the cylinder, a longitudinal side of the injection hole is parallel with a plane orthogonal to a center axis of the cylinder, and the fuel is injected in a direction away from the upper wall surface of the cylinder. In other words, the fuel injection valve may be what is known as "a slit nozzle fuel injection valve".

Other objects, features, and resultant advantageous effects will be easily understood from exemplary embodiments of the invention described below with reference to the drawings.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 18A and 18B are timing charts showing a relationship between a lift amount of a valve body of a fuel injection valve controlled by an engine controller according to a modification of the invention and time, in which FIG. 18A shows a case where the air-fuel mixture is rich and FIG. 18B shows a case where the air-fuel mixture is lean.

DETAILED DESCRIPTION OF EMBODIMENTS

An engine controller (hereinafter, also referred to as "inventive device") according to embodiments of this invention will be described below with reference to the drawings.

(First Embodiment)

Figure 1:
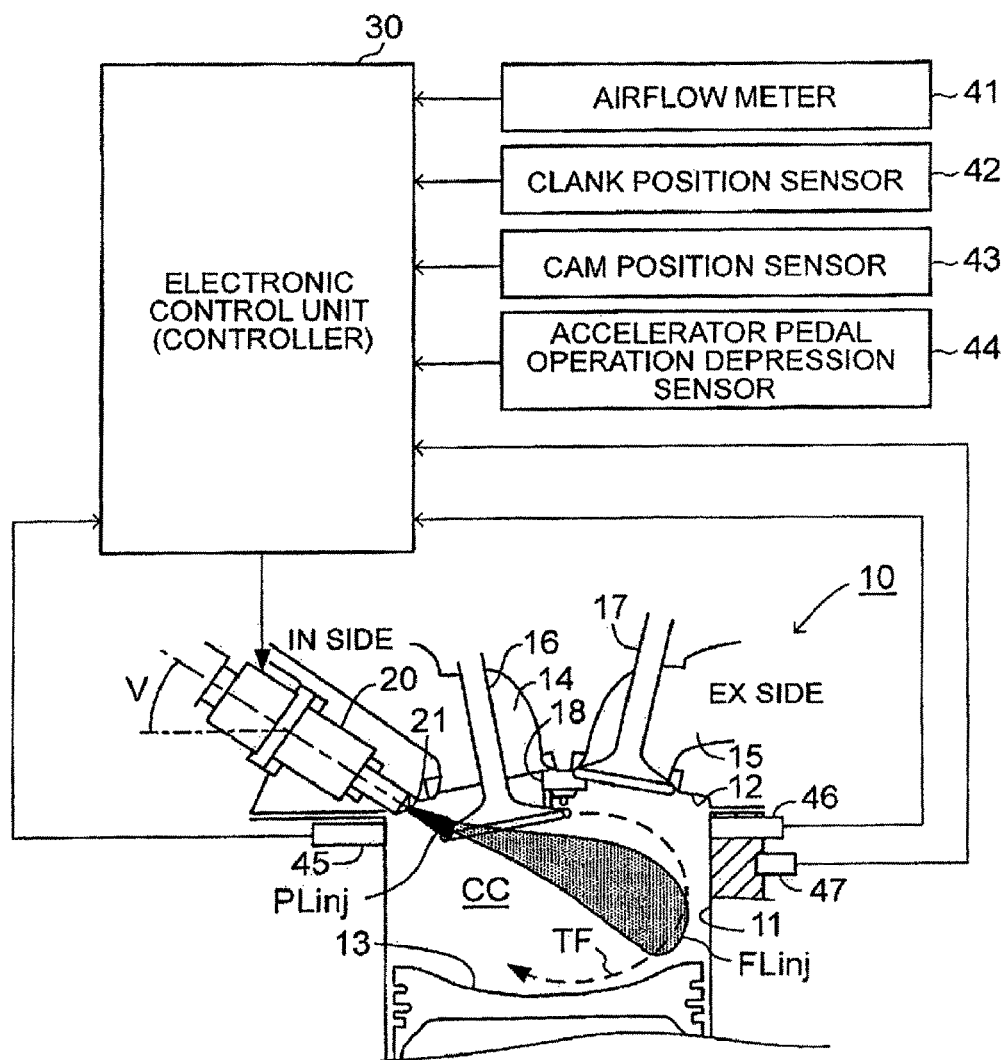
FIG. 1 is a partial schematic cross-sectional view of an internal combustion engine to which an engine controller (first device) according to a first embodiment of the invention is applied.
Figure 2:
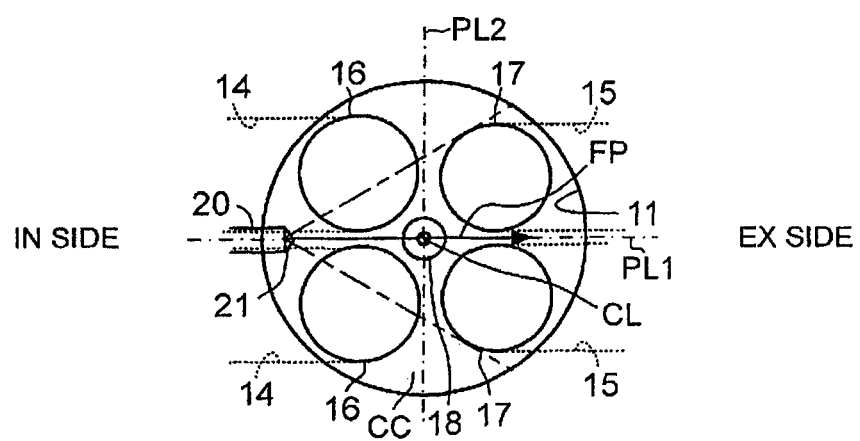
FIG. 2 is a plan view of a cylinder (combustion chamber) shown in FIG. 1.

(Configuration) FIG. 1 is a schematic partial cross-sectional view of any cylinder of an internal combustion engine 10 to which an engine controller (hereinafter, also referred to as "first device") according to a first embodiment of the invention is applied. The engine 10 is a piston reciprocating, direct injection, spark-ignition, multi-cylinder gasoline engine. Each cylinder forms a combustion chamber CC. FIG. 2 is a partial schematic plan view of any cylinder of the engine 10. More specifically, FIG. 2 shows the combustion chamber CC as viewed from a position on a center axis CL of a cylinder bore and above the combustion chamber CC.

As shown in FIG. 1, the combustion chamber CC is a substantially cylindrical space defined by a cylinder bore wall surface (side wall surface of the cylinder). 11, a cylinder head lower wall surface (combustion chamber upper wall surface) 12, and a piston crown plane 13.

An intake port 14 and an exhaust port 15, both of which are in communication with the combustion chamber CC, are formed in a cylinder head portion. The cylinder head portion is further provided with an intake valve 16 and an exhaust valve 17. The intake valve 16 opens and closes "a connection portion between the intake port 14 and the combustion chamber CC" with a cam of an unillustrated intake cam shaft. The exhaust valve 17 opens and closes "a connection portion between the exhaust port 15 and the combustion chamber CC" with a cam of an unillustrated exhaust cam shaft. Thus, the combustion chamber CC is opened and closed by the intake valve 16 and the exhaust valve 17.

Actually, as illustrated in FIG. 2, a pair of intake ports 14 are provided for a single combustion chamber CC. Each of pair of intake valves 16 opens and closes "the contact portion between corresponding one of the intake ports 14 and the combustion chamber CC". The pair of intake valves 16 have the same shape, and are disposed at positions symmetrical about a first plane PL1 passing through the center axis CL of the cylinder bore. The pair of intake valves 16 are disposed in one of two areas (on the left side in the paper plane in FIG. 2) obtained by dividing the combustion chamber CC in two by "a second plane PL2 that passes through the center axis CL of the cylinder bore and is orthogonal to the first plane PL1". This area of the combustion chamber CC is referred to as an adjacent area of the intake valve 16 or may be simply referred to as an intake valve side area.

Similarly, a pair of exhaust ports 15 are provided for a single combustion chamber CC. Each of pair of exhaust valves 17 opens and closes "the contact portion between corresponding one of the exhaust ports 15 and the combustion chamber CC". The pair of exhaust valves 17 have the same shape, and are disposed at positions symmetrical about the first plane PL1. The pair of exhaust valves 17 are disposed in the other one of the two areas (on the right side in the paper plane in FIG. 2) obtained by dividing the combustion chamber CC in two by the second plane PL2. This area of the combustion chamber CC is referred to as an adjacent area of the exhaust valve 17 or may be simply referred to as an exhaust valve side area.

The intake port 14 has a shape designed to generate "tumble flow that flows along the cylinder head lower wall surface 12 (upper wall surface of the combustion chamber CC) from an adjacent portion of the intake valve 16 to an adjacent portion of the exhaust valve 17, then along the side wall surface 11 of the combustion chamber CC facing the intake port 14 (that is, the exhaust valve side) toward the piston crown plane 13, and then along the piston crown plane 13 toward the intake valve side from the exhaust valve side" in the combustion chamber CC, as indicted by a dashed line arrow TF in FIG. 1.

A spark generation unit of an ignition plug 18 is disposed on the lower wall surface 12 of the cylinder head and at the center of the combustion chamber CC.

The engine 10 includes a fuel injection valve 20. The fuel injection valve 20 is fixed to the cylinder head portion, in such a manner that a fuel injection hole 21 is exposed to the combustion chamber CC, at a portion in the cylinder head lower wall surface 12 and adjacent to a circumference on the intake valve side of the combustion chamber CC. In other words, the fuel injection hole 21 is exposed to the combustion chamber CC, at a position in an outer peripheral portion of the cylinder, sandwiched by the pair of intake valves 16.

Figure 3A:
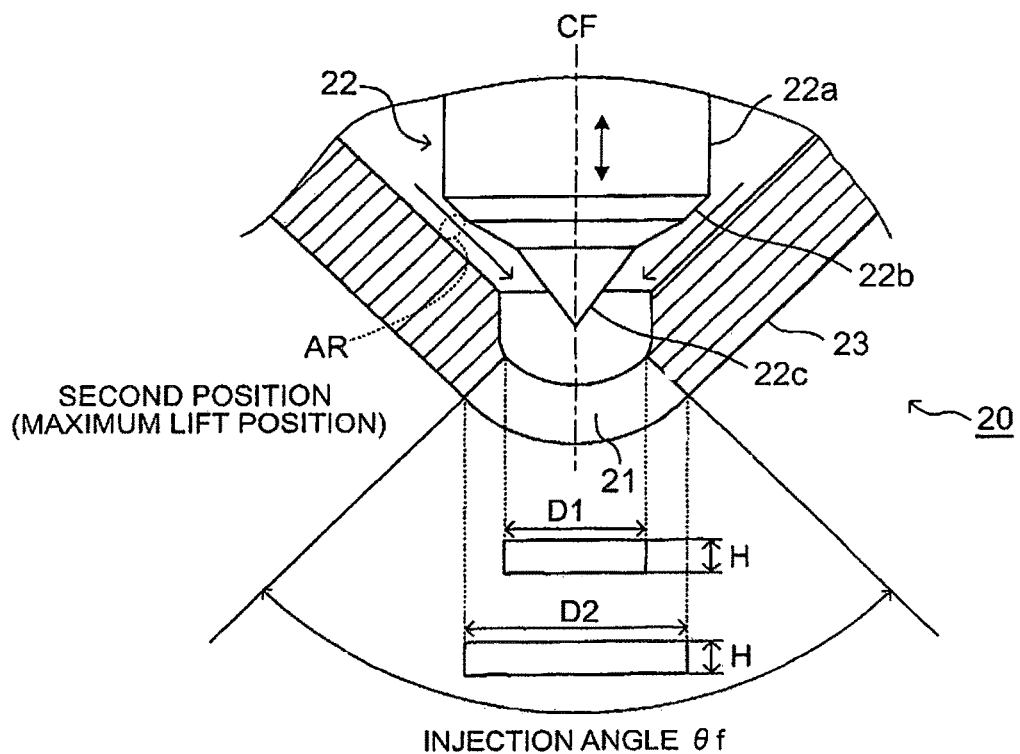
FIGS. 3A and 3B are enlarged cross-sectional views of a portion around a fuel injection hole of a fuel injection valve shown in FIG. 1.
Figure 3B:
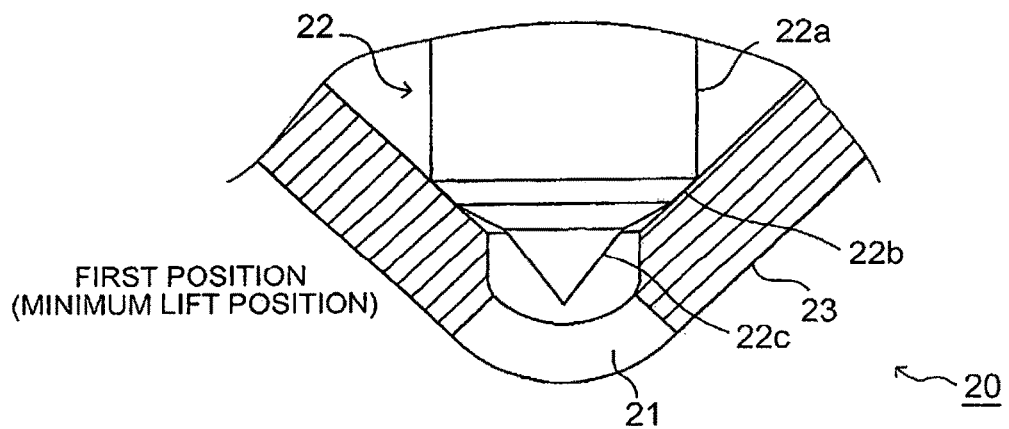

The fuel injection valve 20 includes a conventional needle valve (hereinafter, may be referred to as "valve body") as illustrated in FIGS. 3A and 3B, which are partially enlarged cross-sectional views of a portion around the fuel injection hole 21. The valve body 22 includes a base portion 22a, a reduced diameter portion 22b, and a distal end portion 22c. The base portion 22a has a cylindrical shape. The reduced diameter portion 22b continues from the base portion 22a. The diameter of the reduced diameter portion 22b decreases as it gets closer to the distal end of the valve body 22. The distal end portion 22c continues from the reduced diameter portion 22b and has a conical shape.

The valve body 22 can reciprocate in a direction of a center axis CF of the valve body 22, from a sitting position (also referred to as a first position, an initial position, or a minimum lifted position) to a maximum lift position (second position). FIG. 3A shows a state where the valve body 22 is at the maximum lifted position. FIG. 3B shows a state where the valve body 22 is at the sitting position. A lift amount of the valve body 22 at the, sitting position is a minimum lift amount (that is, "0"). The lift amount of the valve body 22 at the maximum lifted position is a maximum lift amount (that is, "full lift amount"). Specifically, the lift amount of the valve body 22 is a distance between any position, to which the valve body 22 is moving, and the sitting position.

The fuel injection hole 21 is formed in an injection portion 23 as a distal end portion of the fuel injection valve 20. As shown in FIG. 3B, the reduced diameter portion 22b of the valve body 22 is in contact with the inner wall surface of the injection portion 23, when the valve body 22 is at the sitting position. Thus, the fuel injection hole 21 is closed, whereby no fuel is injected. When the valve body 22 is at "a position other than the sitting position" as shown in FIG. 3A, the injection portion 23 of the reduced diameter portion 22b of the valve body 22 is separated from the inner wall surface of the injection portion 23. Thus, the fuel injection hole 21 is opened, whereby the fuel in the injection portion 23 is injected through the fuel injection hole 21.

The fuel injection hole 21 is "an injection hole in the form of a slit". Specifically, a cross-sectional shape of the fuel injection hole 21 taken along a plane orthogonal to the center axis CF of the valve body 22 is a rectangular shape. Thus, the fuel injection valve 20 is a slit nozzle fuel injection valve. An area of the cross section of the fuel injection hole 21 taken along a plane orthogonal to the center axis CF is also referred to as a geometric area. The geometric area of the fuel injection hole 21 increases as it gets closer to the distal end of the fuel injection hole 21 along the center axis CF of the valve body 22 (that is, as it gets closer toward a fuel outlet side from a fuel inlet side (side of the valve body 22) of the fuel injection hole 21). Specifically, a longitudinal side D2 is longer than a longitudinal side D1 in FIG. 3A. The fuel injection hole 21 has a uniform height H. Thus, the fuel injection hole 21 can be regarded as having a fan shape with the thickness H and a predetermined center angle (injection angle) θf.

The fuel injection valve 20 includes a conventional electromagnetic mechanism and a conventional spring mechanism (both of which are not illustrated). When the electromagnetic mechanism is not powered (when the electromagnetic mechanism is in an unpowered state), the spring mechanism moves the valve body 22 to the sitting position, whereby no fuel is injected. When the electromagnetic mechanism is powered (when the electromagnetic mechanism is in a powered state), the valve body 22 moves toward the maximum lifted position from the sitting position, against the force applied by the spring mechanism. Then fuel is injected through the fuel injection hole 21, when the valve body 22 is at a position other than the sitting position.

An electronic control unit (controller) 30 shown in FIG. 1 includes a conventional "microcomputer including a CPU, a read only memory (ROM), and a random access memory (RAM)". The electronic control unit 30 receives detection signals from a plurality of sensors described below.

Specifically, the sensors include an airflow meter 41 that detects an intake air amount (mas flow rate of air) Ga of the engine 10, a clank position sensor 42 that generates a pulse every time an unillustrated clank shaft rotates by a predetermined angle, a cam position sensor 43 that generates a pulse every time an unillustrated cam shaft rotates by a predetermined angle, and an accelerator pedal operation depression sensor 44 that detects a depression amount Accp of an unillustrated accelerator pedal.

The sensors further include an intake valve side cylinder pressure sensor 45 formed on the intake valve side of the combustion chamber CC and detects the pressure in the combustion chamber CC (that is, intake valve side cylinder pressure CPIn), an exhaust valve side cylinder pressure sensor 46 formed on the exhaust valve side of the combustion chamber CC and detects the pressure in the combustion chamber CC (that is, exhaust valve side cylinder pressure CPEx), and a knocking sensor 47 that is fixed on the cylinder bore wall surface of the engine 10 and detects the vibration generated in the engine 10.

The electronic control unit 30 acquires an absolute clank angle CA of each cylinder, based on signals from the clank position sensor 42 and the cam position sensor 43. The electronic control unit 30 acquires an engine rotation speed NE based on a signal from the clank position sensor 42. The electronic control unit 30 determines whether knocking is occurring based on a signal from the knocking sensor 47, through a conventional method. The electronic control unit 30 transmits an ignition signal to an unillustrated igniter to generate a spark from the spark generation of the ignition plug 18. The first device may not include the intake valve side cylinder pressure sensor 45 and the exhaust valve side cylinder pressure sensor 46.

The electronic control unit 30 transmits an injection valve drive signal to the electromagnetic mechanism of the fuel injection valve 20. The electromagnetic mechanism is in the non-powered state when the injection valve drive signal is at "0", and is in the powered state when the injection valve drive signal is at a predetermined voltage Vinj.

The fuel injection performed with the maximum lift amount being the maximum value of the lift amount of the valve body 22 of the fuel injection valve 20 is also referred to as "maximum lift injection, full lift fuel injection, or full lift injection" for convenience. Specifically, the full lift fuel injection is performed with the lift amount of the needle valve (valve body 22) switched within a range between the minimum lift amount ("0") to the maximum lift amount.

Figure 4:
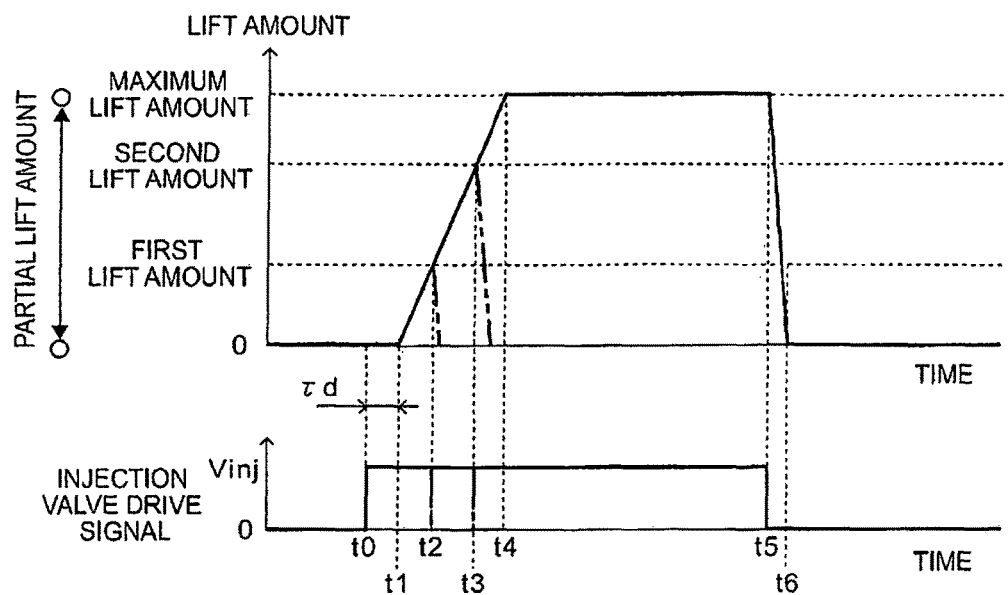
FIG. 4 is a timing chart showing a relationship between an injection valve drive signal and a lift amount of a valve body of the fuel injection valve.

The full lift fuel injection is performed in the following manner. Specifically, as shown in FIG. 4, when the injection valve drive signal is switched from "0" to the predetermined voltage Vinj (that is, when the electromagnetic mechanism is started to be powered) at a time point t0, and an invalid injection time τd elapses, the valve body 22 starts moving at a time point t0. Then, the lift amount of the valve body 22 reaches the maximum lift amount at a time point t4, and the movement of the valve body 22 is restricted by an unillustrated stopper of the fuel injection valve 20. Thus, the lift amount of the valve body 22 is maintained at the maximum lift amount at and after the time point t4. When the injection valve drive signal is switched from the predetermined voltage Vinj to "0" (that is, when powering of the electromagnetic mechanism is stopped) at a time point t5, the lift amount decreases from the maximum lift amount to drop to "0" at a time point t6. The fuel is injected within a period between the time points t1 to t6.

The fuel injection performed with "lift amount (partial lift amount) smaller than the maximum lift amount" being the maximum value of the lift amount of the valve body 22 is also referred to as "partial lift injection", "partial lift fuel injection", or "partial lift injection" for convenience. Specifically, the partial lift fuel injection is performed with the lift amount of the needle valve (valve body 22) switched within a range from the minimum lift amount to the partial lift amount.

The partial lift fuel injection, with the maximum value of the lift amount of the valve body 22 set to a first lift amount in FIG. 4, is performed in the following manner. Specifically, when the injection valve drive signal is switched from "0" to the predetermined voltage Vinj at the time point t0, and after the invalid injection time τd elapses, the valve body 22 starts moving at the time point t1. Then, the lift amount of the valve body 22 reaches a "first lift amount smaller than the maximum lift amount" at a time point t2 before the time point t4. At the time point t2, the injection valve drive signal is switched from the predetermined voltage Vinj to "0". As a result, the lift amount decreases from the first lift amount to drop to "0" right after the time point t2. The fuel is injected within a period from the time point t1 to the time point right after the time point t2.

Similarly, the partial lift fuel injection, with the maximum value of the lift amount of the valve body 22 set to a second lift amount in FIG. 4, is performed in the following manner. The second lift amount is smaller than the maximum lift amount and larger than the first lift amount. To perform this partial lift fuel injection, the injection valve drive signal is switched from "0" to the predetermined voltage Vinj at the time point t0. Then, after the invalid injection time τd, valve body 22 starts moving at the time point U. Then, the lift amount of the valve body 22 reaches the "second lift amount" at a time point t3 before the time point t4 and after the time point t2. At the time point t3, the injection valve drive signal is switched from the predetermined voltage Vinj to "0". As a result, the lift amount decreases from the second lift amount to reach "0" right after the time point t3. The fuel is injected within a period from the time point t1 to the time point right after t3.

As shown in FIG. 2, the fuel injection valve 20 is disposed and configured in such a manner that in plan view of the cylinder (combustion chamber CC), a center axis FP of fuel spray formed by the fuel injected through the fuel injection hole 21 substantially matches the center line (included in the first plane PL1) between the two intake valves 16 formed on the upper wall surface of the cylinder. The fuel injection valve 20 is disposed in such a manner that the longitudinal side of the fuel injection hole 21 becomes parallel with a plane orthogonal to the center axis CL of the cylinder and with the second plane PL2 orthogonal to the first plane PL1. As shown in FIG. 1, the fuel injection valve 20 is disposed to inject fuel in a direction apart from the cylinder head lower wall surface (combustion chamber upper wall surface) 12 by a predetermined angle (an acute angle) V. Specifically, the fuel injection valve 20 is disposed in such a manner that the center axis FP of the fuel spray is inclined by the angle V with respect to the plane orthogonal to the center axis CL of the cylinder.

When the fuel injection valve 20 having the configuration described above is used, as the lift amount of the valve body 22 decreases, a flow path between the reduced diameter portion 22b of the valve body 22 and the inner wall surface of the injection portion 23 becomes narrower (see an oval AR drawn with the dashed line in FIG. 3A). Thus, the flow path resistance to the fuel flowing to the fuel injection hole 21 from the side of the base portion 22a of the valve body 22 increases. All things considered, a smaller lift amount of the valve body 22 leads to a slower initial speed of the injected fuel. Thus, when the valve body 22, in the process of moving to the maximum lift position from the sitting position, is returned to the sitting position (without being maintained at the same position) to perform the partial fuel injection, the injected fuel spray travel distance (penetration force of the spray) and the combustion mode (how the flame spreads) largely differ from those in the full lift injection. This will be described below.

Figure 5:
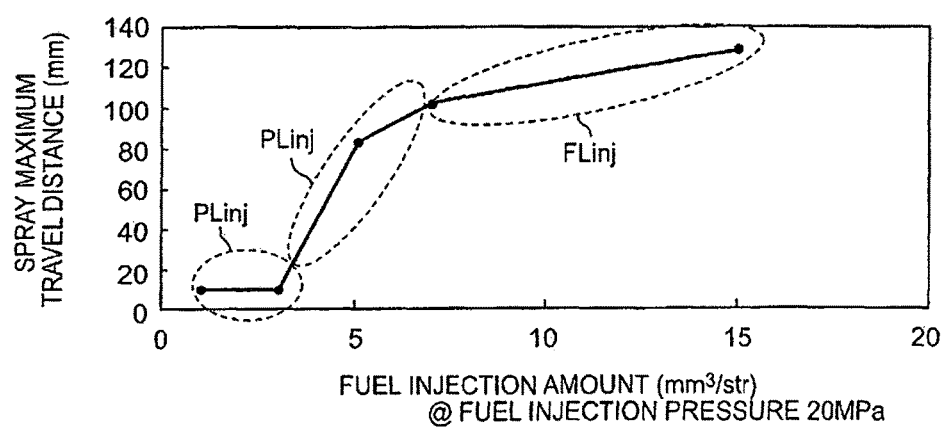
FIG. 5 is a graph showing fuel spray maximum travel distances in cases where full lift fuel injection and partial lift fuel injection are performed.

FIG. 5 is a graph showing "a relationship between the fuel injection amount and the maximum spray travel distance" in a case where, the fuel is injected from the fuel injection valve 20, under a constant fuel injection pressure (20 MPa). An environmental pressure of the injection is the atmospheric pressure. In the graph, a portion denoted by PLinj represents data in the partial lift fuel injection, and a portion denoted by FLinj represents data in the full lift fuel injection. The maximum spray travel distance is a distance between the fuel injection hole 21 and a distal end of the spray formed by the injected fuel, which is a portion where the speed in the injection direction is "0". It can be found in the graph that the maximum spray travel is shorter in the partial lift fuel injection than in the full lift fuel injection. It can be further found that, in the partial lift fuel injection, the maximum spray travel distance can be shortened by reducing the fuel injection amount (that is, by reducing the maximum value of the lift amount (partial lift amount) for the partial lift fuel injection).

Thus, with the partial lift fuel injection, the fuel spray can be formed at a desired position in the combustion chamber CC, by adjusting the partial lift amount (that is, by adjusting the fuel injection amount). Specifically, the fuel spray can be formed adjacent to the fuel injection hole 21 (that is, the intake valve side in the combustion chamber CC, adjacent area of the intake valve) by performing the partial lift fuel injection with the fuel injection amount set to be relatively low (that is, with the maximum lift amount set to a relatively small first lift amount). Furthermore, the fuel spray can be formed on the exhaust valve side of the combustion chamber CC (adjacent to the exhaust valve and slightly away from the cylinder bore wall surface in the fuel injection direction) by performing the partial lift fuel injection with a relatively large fuel injection amount (that is, with the maximum lift value set to be the second lift amount that is relatively large).

Figure 6:
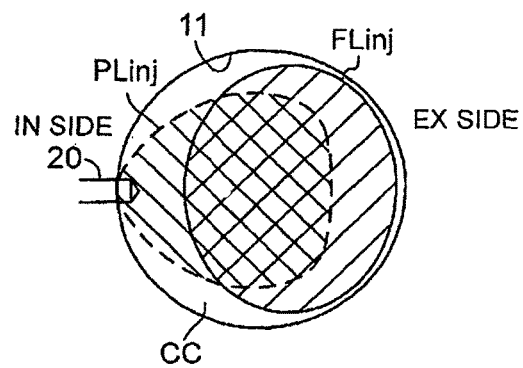
FIG. 6 is a schematic view of flame spreading states in the combustion chamber at a point where a predetermined time period has elapsed after fuel injection.

FIG. 6 is a diagram schematically showing spreading states of the frame in the combustion chamber CC, at a point after a predetermined period of time has elapsed. As shown in FIG. 6, the flame (denoted by PLinj), as a result of the partial lift fuel injection with a relatively small fuel injection amount, spreads in a portion more on the intake valve side than a portion in which the flame (denoted by FLinj) as a result of the full lift fuel injection spreads. The flame (denoted by FLinj) obtained by the full lift fuel injection is in a portion on the exhaust valve side but not on the intake valve side. Thus, when the full lift fuel injection is performed while a large load is imposed on the engine 10, the flame (combustion gas) spreading on the exhaust valve side compresses unburned gas (end gas) on the intake valve side. As a result, knocking occurs in an area on the intake valve side.

In a portion where the fuel spray is formed, a fuel concentration is high and thus a combustion speed is high (a flame propagation speed is high). Thus, in such a portion, the unburned gas can be normally burned by the fuel spray before being compressed by the combustion gas (flame), that is, before the knocking occurs. All things considered, the knocking can be prevented from occurring at a portion adjacent to an area where the fuel spray is formed.

Thus, the knocking occurring in the area on the intake valve side can be controlled, by forming the fuel spray on the intake valve side, through the partial lift fuel injection with a relatively small fuel injection amount. This "partial lift fuel injection with a relatively small fuel injection amount" for controlling the knocking occurring in an area on the intake valve side will also be simply referred to as "intake valve side partial lift fuel injection (first partial lift fuel injection with the partial lift amount set to the first lift amount)" in the description below.

Similarly, the knocking occurring on the exhaust valve side can be controlled, by forming the fuel spray on the exhaust valve side, through the partial lift fuel injection with a relatively large fuel injection amount. This "partial lift fuel injection with a relatively large fuel injection amount" for controlling the knocking in an area on the exhaust valve side will also be simply referred to as "exhaust valve side partial lift fuel injection (second partial lift fuel injection with the partial lift amount set to the second lift amount larger than the first lift amount)" in the description below.

The partial lift fuel injection (the intake valve side partial lift fuel injection and the exhaust valve side partial lift fuel injection) for controlling the knocking, is performed at least once at a predetermined timing close to an ignition timing. Generally, the ignition timing is close to a compression top dead center, and thus the partial lift fuel injection for controlling the knocking, is performed at least once at a predetermined timing close to the compression top dead center. The partial lift fuel injection for controlling the knocking maybe performed before or after the ignition timing.

(Operation) Next, operations of the first device will be described. The electronic control unit 30 of the first device determines the fuel injection amount Finj, based on the engine rotation speed NE, the intake air amount Ga, and a target air-fuel ratio (stoichiometric air-fuel ratio in this example). With the fuel injection amount Finj thus determined, the air-fuel ratio (engine air-fuel ratio) of the air-fuel mixture supplied to the engine 10 is set to the target air-fuel ratio. The fuel injection amount Finj is the amount of fuel injected by a single fuel injection valve 20, in a single combustion cycle (single intake/combustion process). When the knocking is not occurring, the electronic control unit 30 injects the fuel, in the fuel injection amount Finj, through "single full lift injection". Generally, the single full lift injection is performed at an early point of an air intake process or a compression process (thus, before the ignition timing).

When the knocking occurs, the electronic control unit 30 performs the single full lift injection and further performs the partial lift fuel injection at least once at a predetermined timing close to the ignition timing. Thus, the knocking is controlled. When the electronic control unit 30 performs the partial lift fuel injection to inject the fuel in the fuel injection amount Pinj in total, the amount of fuel injected by a single full lift injection, performed before the partial lift injection, is obtained by subtracting the fuel injection amount Pinj from the fuel injection amount Finj.

Figure 7:
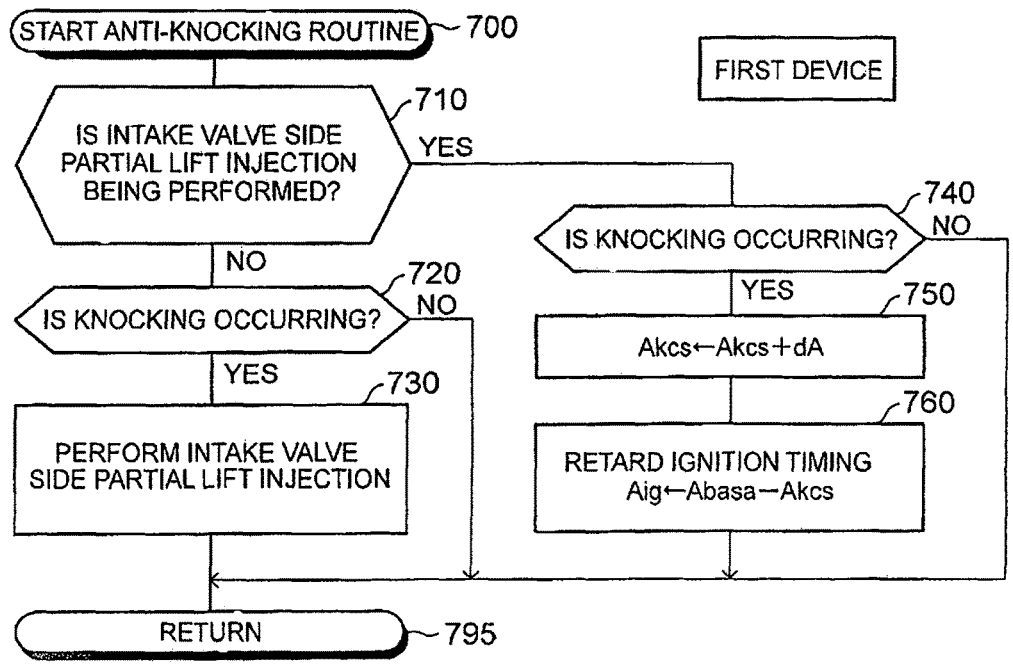
FIG. 7 is a flowchart showing a routine performed by a central processing unit (CPU) of the electronic control unit (controller) shown in FIG. 1.

In an actual operation, the CPU of the electronic control unit 30 performs processing of an anti-knocking routine, shown in a flowchart in FIG. 7, for any cylinder, every time a clank angle of the cylinder matches an intake top dead center.

Specifically, when the clank angle of a certain cylinder (hereinafter, referred to as "predetermined cylinder" for convenience) matches the intake top dead center of the predetermined cylinder, the CPU starts the processing in step 700 in FIG. 7. Then, the CPU proceeds to step 710, and determines whether "intake valve side partial lift fuel injection is being performed for the predetermined cylinder" at the current time point.

Here, it is assumed that the "intake valve side partial lift fuel injection for the predetermined cylinder" is not being performed at the current time point. Here, the CPU determines "No" is step 710, and the CPU proceeds to step 720 to determine whether "the knocking is occurring in the predetermined cylinder" through a conventional method, based on the signal from the knocking sensor 47. When the knocking is not occurring in the predetermined cylinder, the CPU determines "No" in step 720, and directly proceeds to step 795 to temporarily terminate the routine.

Upon determining that the knocking is occurring in step 720 (that is, upon determining that "a request to control the knocking (anti-knocking request)" is in effect), the CPU determines "Yes" in step 720. Thus, the CPU proceeds to step 730, and performs the intake valve side partial lift fuel injection. Then, the CPU proceeds to step 795 and temporarily terminates the routine.

Figure 8:
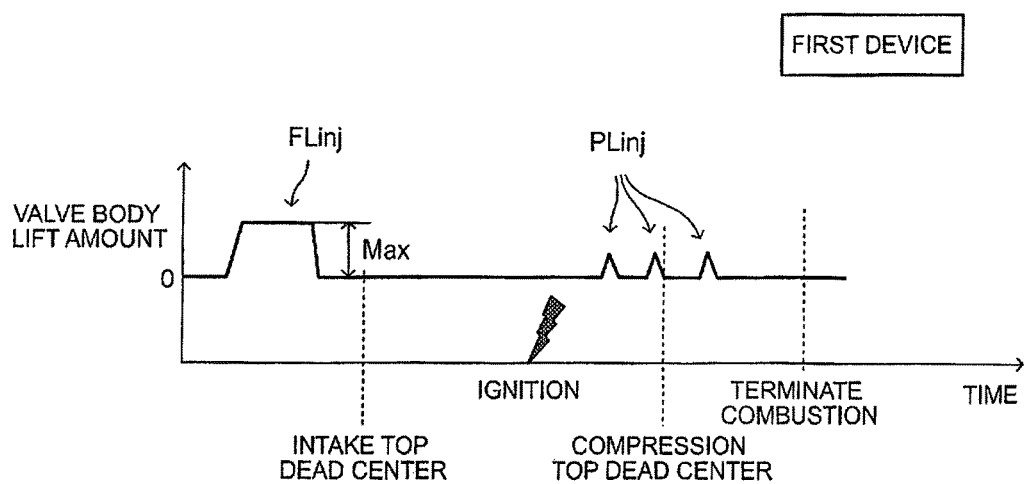
FIG. 8 is a timing chart showing a relationship between time and the lift amount of the valve body of the fuel injection valve in a case where anti-knocking control is performed.

As a result, the full lift fuel injection FLinj is performed once for the Predetermined cylinder as shown in FIG. 8. Then, the intake valve side partial lift fuel injection PLinj is performed for a plurality of times (three times in this embodiment, but may be once) at predetermined timings close to the ignition timing (thus, close to the compression top dead center). Generally, the knocking has a higher chance to occur on the intake valve side as described above. Thus, generally, the knocking is controlled by the intake valve side partial lift fuel injection PLinj.

Then, the CPU resumes the processing of the routine in FIG. 7, from step 700. Here, the intake valve side partial lift fuel injection is being performed, and thus the CPU determines "Yes" in step 710, and proceeds to step 740 to determine whether the knocking is occurring. When the knocking is not occurring, the CPU determines "No" in step 740, and proceeds directly to step 795 to temporarily terminate the routine. When the knocking is controlled by the intake valve side partial lift fuel injection as described above, the intake valve side partial lift fuel injection is terminated (see step 980 in FIG. 9 described later).

When the knocking is still occurring even though the intake valve side partial lift fuel injection is being performed, the CPU determines "Yes" in step 740, and proceeds to steps 750 and 760 to perform processing of retarding the ignition timing.

Specifically, in step 750, the CPU increments an anti-knocking retard amount Akcs by a predetermined positive value dA. The anti-knocking retard amount Akcs is set to "0" through an unillustrated initial routine performed when the engine 10 is started. Then, the CPU proceeds to step 760 to set a final ignition timing Aig. The final ignition timing Aig is obtained by retarding the "basic ignition timing Abase independently determined based on the load and the engine rotation speed NE of the engine 10" by the anti-knocking retard amount Akcs. The electronic control unit 30 ignites the predetermined cylinder at the ignition timing Aig. Then, the CPU proceeds to step 795 to temporarily terminate the routine.

Upon determining that the knocking is still occurring even through the intake valve side partial lift fuel injection is being performed, the CPU retards the ignition timing to control the knocking. When the knocking continues, the CPU determines "No" in step 710 and "Yes" in step 740. Thus, the ignition timing is retarded by the retard increment amount dA through the processing in steps 750 and 760.

Figure 9:
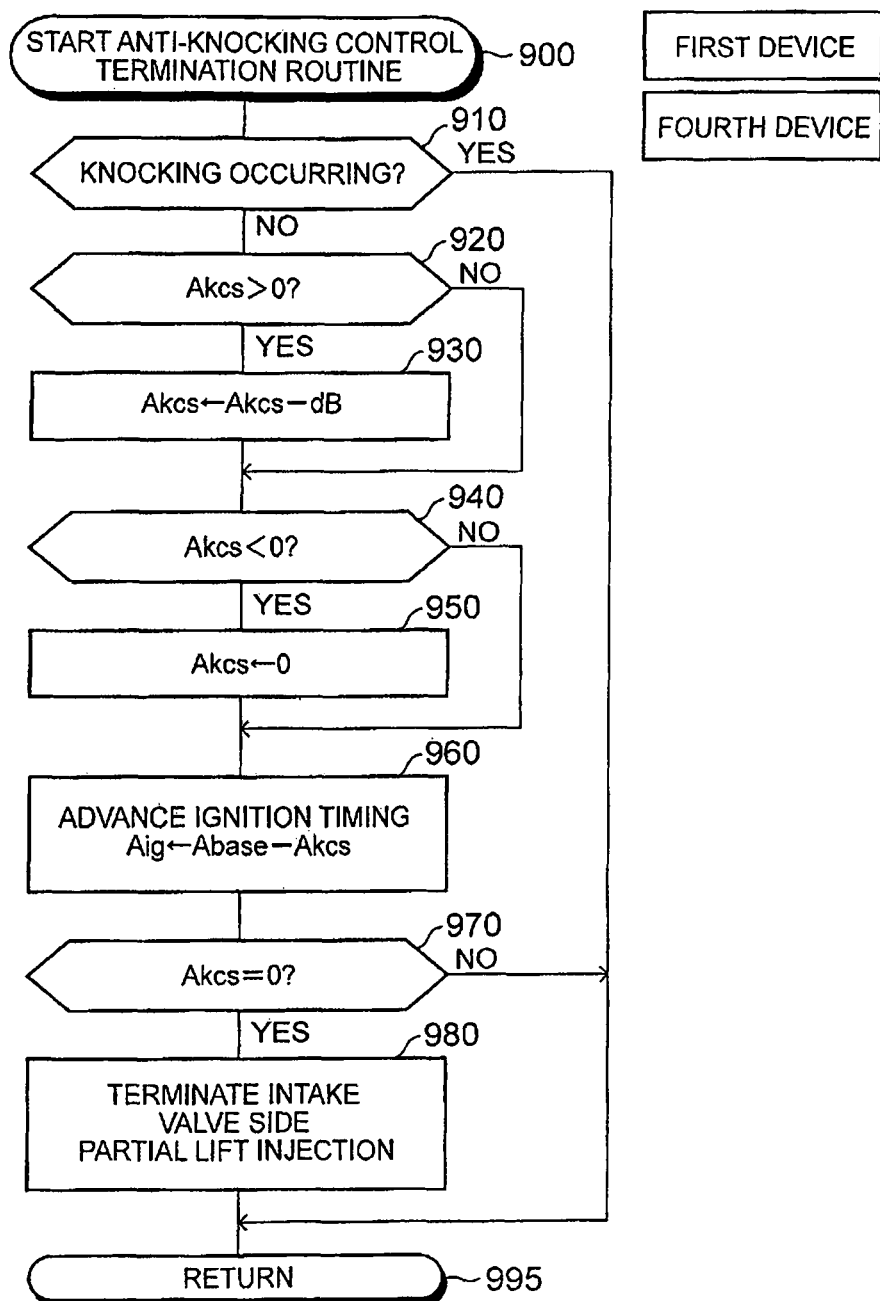
FIG. 9 is a flowchart showing a routine performed by the CPU of the electronic control unit shown in FIG. 1.

Upon terminating the, processing in the routine in FIG. 7, the CPU immediately proceeds to an anti-knocking control termination routine shown in a flowchart in FIG. 9. Specifically, the CPU proceeds to step 900 from step 795 in FIG. 7. Then, the CPU proceeds to step 910 to determine whether "the knocking is occurring in the predetermined cylinder". When the knocking is occurring, the CPU determines "Yes" in step 910 and directly proceeds to step 995 to temporarily terminate the routine. Thus, the partial lift fuel injection continues, with the retarded ignition timing if the ignition timing has been retarded.

When the knocking is not occurring in the predetermined cylinder at the point where the CPU performs the processing in step 910, the CPU determines "No" in step 910, and proceeds to step 920 to determine whether the knocking retarded amount Akcs is larger than "0". Specifically, the CPU determines whether the ignition timing is retarded at the current time point. When the knocking retarded amount Alms is not larger than "0", the CPU determines "No" in step 920, and directly proceeds to step 940.

When the knocking retarded amount Akcs is larger than "0", the CPU determines "Yes" in step 920, and proceeds to step 930 to decrement the knocking retarded amount Akcs by a predetermined positive value dB smaller than the value dA. Then, the CPU proceeds to step 940.

In step 940, the CPU determines whether the anti-knocking retard amount Akcs is smaller than "0". When the anti-knocking retard amount Akcs is smaller than "0", the CPU proceeds to step 950 to set the anti-knocking retard amount Akcs to be "0", and then proceeds to step 960. When the anti-knocking retard amount Akcs is not smaller than "0", the CPU directly proceeds to step 960 from step 940.

In step 960, the CPU sets the "ignition timing obtained by retarding the basic ignition timing Abase by the, anti-knocking retard amount Akcs" as the final ignition timing Aig. The electronic control unit 30 performs the ignition for the predetermined cylinder at the ignition timing Aig thus set. As a result, the ignition timing is advanced toward the basic ignition timing Abase by the value dB each time the CPU determines that the ignition timing is retarded to control the knocking, even when no knocking is occurring.

Then, the CPU proceeds to step 970 to determine whether the anti-knocking retard amount Akcs is "0". In other words, the CPU determines whether the final ignition timing Aig of the predetermined cylinder at the current time point is retarded from the basic ignition timing Abase to control the knocking. When the anti-knocking retard amount Akcs is not "0", the CPU determines "No" in step 970, and directly proceeds to step 995 to temporarily terminate the routine. As a result, the processing in step 980 described later is not performed, whereby the intake valve side partial lift fuel injection is continued to be performed as long as. the ignition timing is retarded to control the knocking.

When the anti-knocking, retard amount Akcs is "0" at the point at which the CPU performs the processing in step 970, the CPU determines "Yes" in step 970, and proceeds to step 980 to terminate the intake valve side partial lift fuel injection. Then, the CPU proceeds to step 995 to temporarily terminate the routine.

As described above, the first device is the engine controller including the controller (electronic control unit 30) that injects the fuel from the fuel injection valve 20 by changing the lift amount of the valve body 22. The controller performs the first fuel injection (main fuel injection, a single full lift fuel injection) before the ignition timing through an unillustrated routine. The controller determines whether the request to control the knocking is in effect (step 720 in FIG. 7). Upon determining that the request is in effect, the controller injects the fuel (thus, performs the partial lift fuel injection) at "the predetermined timing close to the ignition timing (compression top dead center)" after the first fuel ignition (step 730 in FIG. 7). This partial lift fuel injection is performed with the lift amount adjusted within the range up to "the partial lift amount smaller than the maximum lift amount".

Thus, the first device can control the knocking without retarding the ignition timing. The first device retards the ignition timing when the knocking cannot be controlled by the intake valve side partial lift fuel injection (steps 740 to 760 in FIG. 7). The retarded amount herein can be smaller than that in a case where the knocking is controlled only by retarding the ignition timing. Furthermore, the fuel injected by the partial lift fuel injection can contribute to the torque generation. As a result, the knocking can be controlled with smaller degradation of the fuel efficiency due to the retarded ignition timing.

(Second Embodiment)

An engine controller (hereinafter, also referred to as "second device") according to a second embodiment of the invention is different from the first device in the following point. Specifically, upon determining that the knocking has occurred in a state where no control for controlling the knocking (the partial lift fuel injection and the ignition timing retarding) is performed, the CPU first performs the intake valve side partial lift fuel injection. Then, upon determining that the knocking is still occurring in this state, the CPU performs the exhaust valve side partial lift fuel injection instead of the intake valve side partial lift fuel injection.

Figure 10:
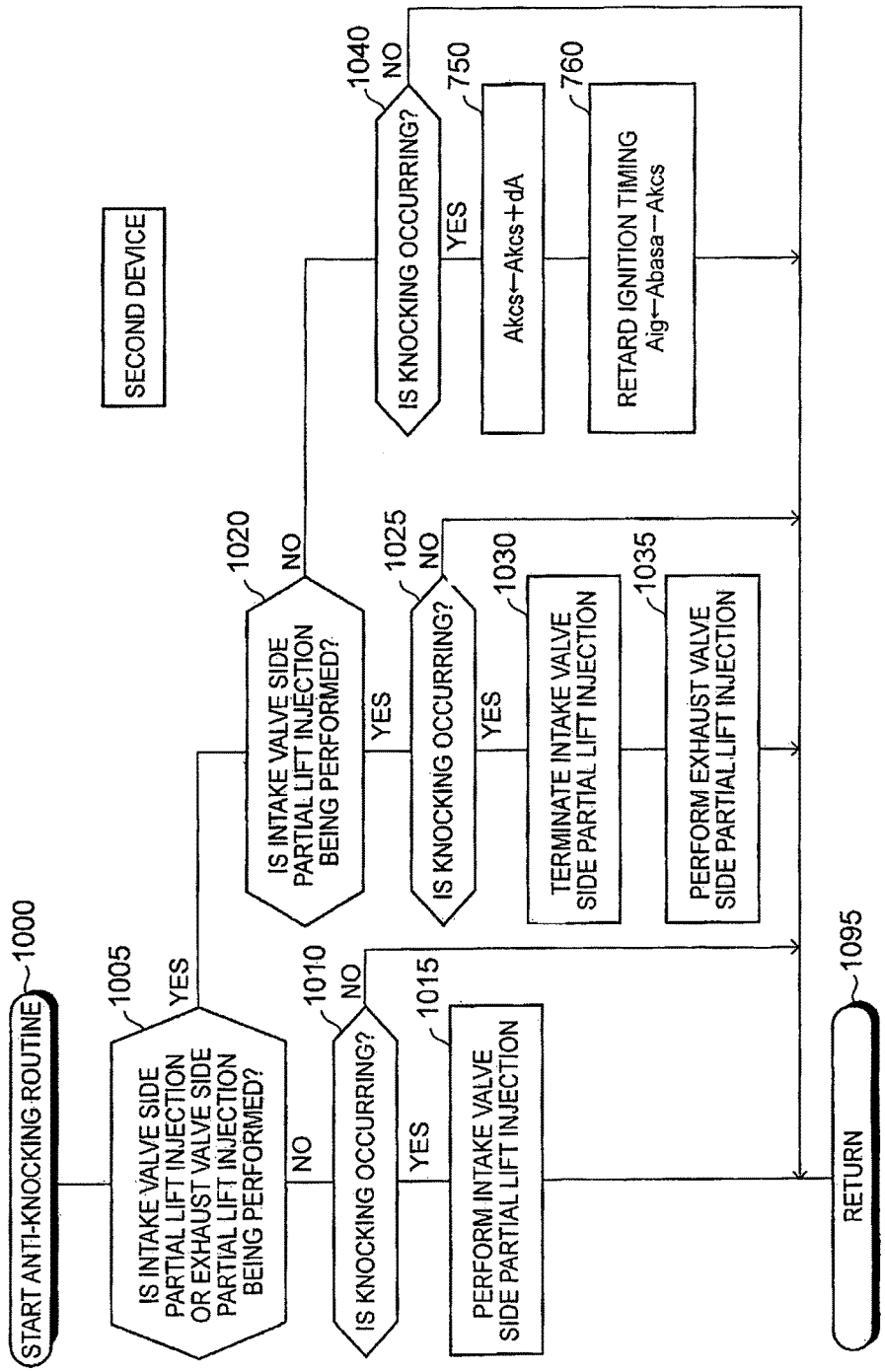
FIG. 10 is a flowchart showing a routine performed by a CPU of an engine controller (second device) according to a second embodiment of the invention.

More specifically, a CPU of the electronic control unit 30 of the second device performs processing of an anti-knocking routine, shown in a flowchart in FIG. 10, for any cylinder, every time a clank angle of the cylinder matches an intake top dead center.

Thus, when the clank angle of a certain cylinder (hereinafter, referred to as "predetermined cylinder" for convenience) matches the intake top dead center of the predetermined cylinder, the CPU starts the processing in step 1000 in FIG. 10. Then, the CPU proceeds to step 1005 to determine whether "intake valve side partial lift fuel injection or the exhaust valve side partial lift fuel injection is being performed for the predetermined cylinder" at the current time point.

The CPU determines "No" is step 1005, when neither the intake valve side partial lift fuel injection nor the exhaust valve side partial lift fuel injection is performed. Then, the CPU proceeds to step 1010 to determine whether the knocking is occurring. When the knocking is not occurring in the predetermined cylinder, the CPU determines "No" in step 1010, and directly proceeds to step 1095 to temporarily terminate the routine.

When the CPU determines that the knocking is occurring in step 1010, the CPU proceeds to step 1015, and performs the intake valve side partial lift fuel injection. Then, the CPU directly proceeds to step 1095 to temporarily terminate the routine. As a result, the first fuel injection (main fuel injection, a single full lift fuel injection) FLinj is performed for the predetermined cylinder through an unillustrated routine. Then, the intake valve side partial lift fuel injection PLinj is further performed for a plurality of times (which is three times in this embodiment but may be once) at timings close to the ignition timing. Generally, the knocking has a higher chance to occur on the intake valve side. Thus, generally, the knocking is likely to be controlled by the intake valve side partial lift fuel injection PLinj.

Then, the CPU resumes the processing of the routine in FIG. 10 from step 1000. This time, the intake valve side partial lift fuel injection is being performed, and thus the CPU determines "Yes" in step 1005, and proceeds to step 1020 to determine whether the intake valve side partial lift fuel injection is being performed. Here, the intake valve side partial lift fuel injection is being performed; and thus the CPU determines "Yes" in step 1020, and proceeds to step 1025 to determine whether the knocking is occurring.

In step 1025, the CPU determines "No" when the knocking is not occurring, and directly proceeds to step 1095 to temporarily terminate the routine. When the knocking is thus controlled by the intake valve side partial lift fuel injection, the intake valve side partial lift fuel injection is terminated (see step 1110 in FIG. 11, described later).

When the knocking is occurring even through the intake valve side partial lift fuel injection is being performed, the knocking is likely to be occurring in an area on the exhaust valve side. In this case, the CPU determines "Yes" in step 1025 and proceeds to step 1030 to terminate the intake valve side partial lift fuel injection. Then, the CPU proceeds to step 1035 and performs the exhaust valve side partial lift fuel injection, and then proceeds to step 1095 to temporarily terminate the routine.

Then, the CPU resumes the processing of the routine in FIG. 10 from step 1000. This time, the exhaust valve side partial lift fuel injection is being performed, and thus the CPU determines "Yes" in step 1005, determines "No" in step 1020, and proceeds to step 1040 to determine whether the knocking is occurring. In step 1040, the CPU determines "No" when the knocking is not occurring, and directly proceeds to step 1095 to temporarily terminate the routine. When the knocking is thus controlled by the exhaust valve side partial lift fuel injection, the exhaust valve side partial lift fuel injection is terminated (see step 1110 in FIG. 11, described later).

When the knocking is occurring even through the exhaust valve side partial lift fuel injection is being performed, the CPU determines "Yes" in step 1040, and thus proceeds to steps 750 and 760 to perform the processing of retarding the ignition timing. The processing in steps 750 and 760 has already been described, and thus will not be described herein.

As described above, upon determining that the knocking is occurring even through the exhaust valve side partial lift fuel injection is being performed, the CPU retards the ignition timing to control the knocking. The processing in steps 750 and 760 is repeated as long as the knocking continues, and the ignition timing is retarded every time.

Figure 11:
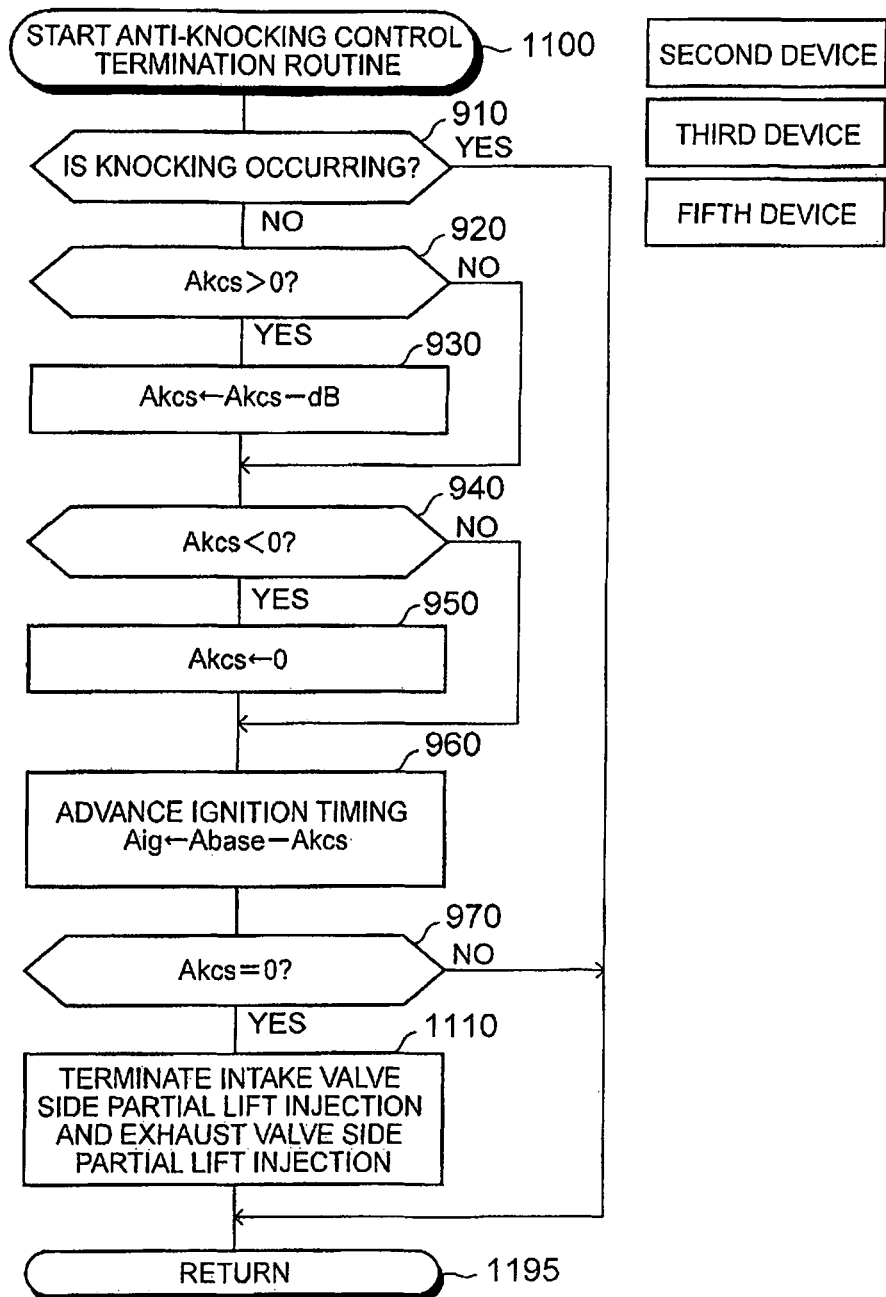
FIG. 11 is a flowchart showing a routine performed by the CPU in the second device.

When the processing of the routine in FIG. 10 is terminated, the CPU immediately performs an anti-knocking control termination processing shown in a flowchart in FIG. 11. The steps in FIG. 11, in which the processing that is the same as the already described step is performed, are denoted with the same numbers as the counterparts, and thus the overlapping description will be omitted as appropriate.

The routine in FIG. 11 is only different from the routine in FIG. 9, in that step 980 in FIG. 9 is replaced with step 1110. Thus, when any one of the intake valve side partial lift fuel injection and the exhaust valve side partial lift fuel injection is being performed under the condition that the knocking is not occurring and the ignition timing is not retarded to control the knocking (when the anti-knocking retard amount Akcs is "0"), the CPU terminates the partial lift fuel injection being performed.

As described above, the second device performs the first fuel injection (main fuel injection, a single full lift fuel injection) before the ignition timing. Furthermore, upon determining that the anti-knocking request is in effect (knocking is started to be detected in a state where no knocking is detected), the second device performs the first partial lift fuel injection (intake valve side partial lift fuel injection) with the partial lift amount set to the first lift amount. Thus, the fuel spray is formed on the intake valve side in the combustion chamber CC (steps 1005 to 1015 in FIG. 10). When the knocking is still detected even through the first partial lift fuel injection is being performed, the CPU performs the second partial lift fuel injection (exhaust valve side partial lift fuel injection) with the partial lift amount set to the second lift amount larger than the first lift amount. Thus, the fuel spray is formed on the exhaust valve side in the combustion chamber CC (steps 1020 to 1035 in FIG. 10).

As described above, when the knocking is detected, first, the knocking on the intake valve side, where the knocking has a higher chance to occur, is controlled by the first partial lift fuel injection. Then, when the knocking is still detected after the first partial lift fuel injection is performed, the knocking is likely to be occurring on the exhaust valve side. Thus; the second partial lift fuel injection is performed to control the knocking occurring on the exhaust valve side. All things considered, by selectively using the first partial lift fuel injection and the second partial lift fuel injection, the knocking can be effectively controlled, without identifying whether the knocking is occurring on the intake valve side or on the exhaust valve side in the combustion chamber.

(Third Embodiment)

An engine controller (hereinafter, also referred to as "third device") according to a third embodiment of the invention identifies whether the knocking is occurring on the intake valve side or on the exhaust valve side in the combustion chamber, based on the signals from the intake valve side cylinder pressure sensor 45 and the exhaust valve side cylinder pressure sensor 46, upon determining that the knocking is occurring, based on the signal from the knocking sensor 47.

Upon determining that the knocking is occurring on the intake valve side, the third device performs the intake valve side partial lift fuel injection. Upon determining that the knocking is occurring on the exhaust valve side, the third device performs the exhaust valve side partial lift fuel injection. Upon determining that the knocking is still occurring even though the intake valve side partial lift fuel injection or the exhaust valve side partial lift fuel injection is being performed, the third device retards the ignition timing. Aside from this, the third device is the same as the first device and the second device.

Figure 12:
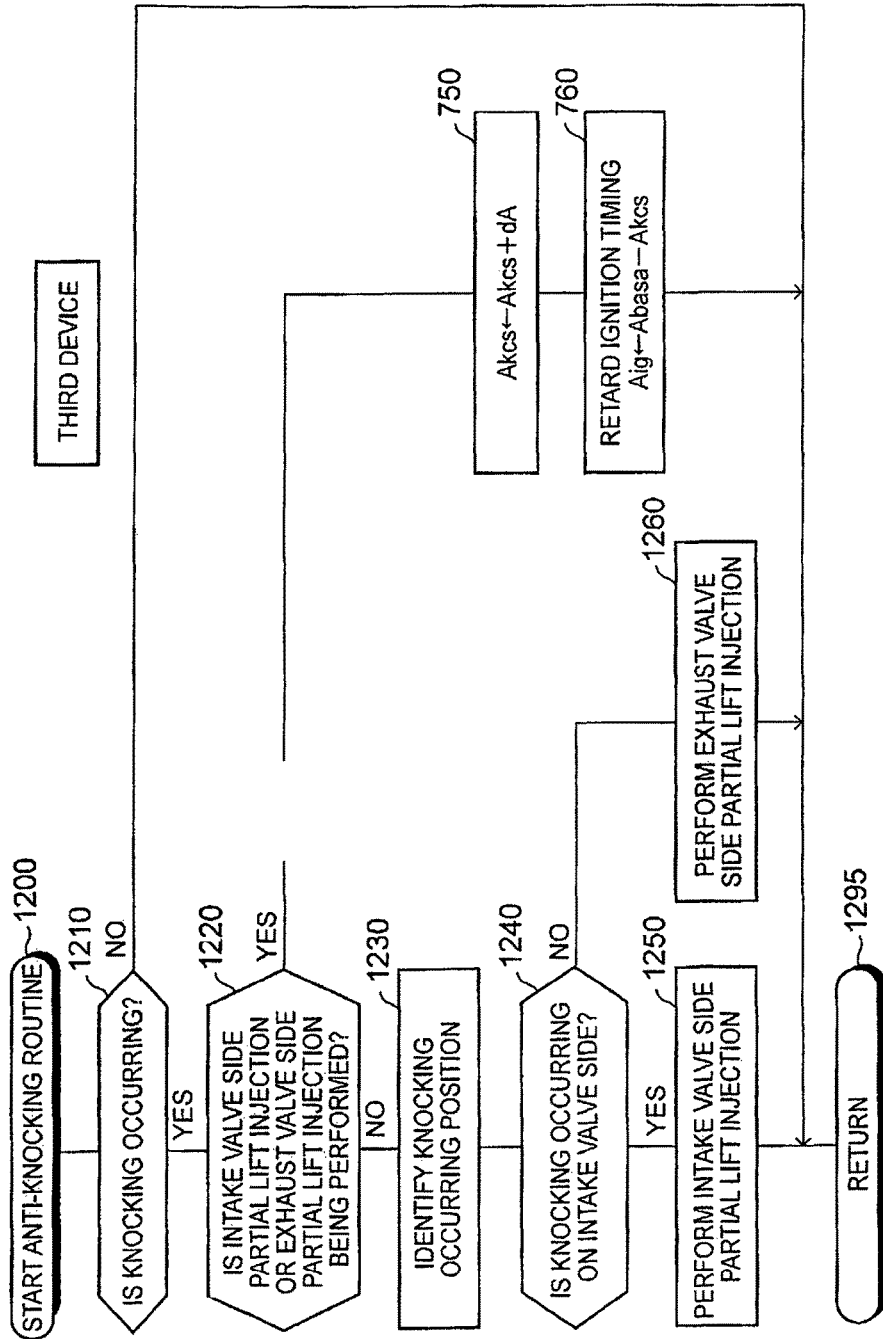
FIG. 12 is a flowchart showing a routine performed by the CPU of an engine controller (third device) according to a third embodiment of the invention.

More specifically, the CPU of the electronic control unit 30 of the third device performs processing of an anti-knocking routine, shown in a flowchart in FIG. 12, for any cylinder, every time a clank angle of the cylinder matches an intake top dead center.

Thus, when the clank angle of a certain cylinder (hereinafter, referred to as "predetermined cylinder" for convenience) matches the intake top dead center of the predetermined cylinder, the CPU starts the processing in step 1200 in FIG. 12. Then, the CPU proceeds to step 1210 to determine whether the knocking is occurring in the predetermined cylinder. When the knocking is not occurring in the predetermined cylinder, the CPU determines "No" in step 1210, and directly proceeds to step 1295 to temporarily terminate the routine.

Upon determining that the knocking is occurring in step 1210, the CPU proceeds to step 1220, and determines whether "any one of the intake valve side partial lift fuel injection and the exhaust valve side partial lift fuel injection is being performed for the predetermined cylinder" at the current time point.

When neither the intake valve side partial lift fuel injection nor the exhaust valve side partial lift fuel injection is performed, the CPU determines "No" in step 1220, and proceeds to step 1230 to identify an occurring position of the knocking.

Figure 13:
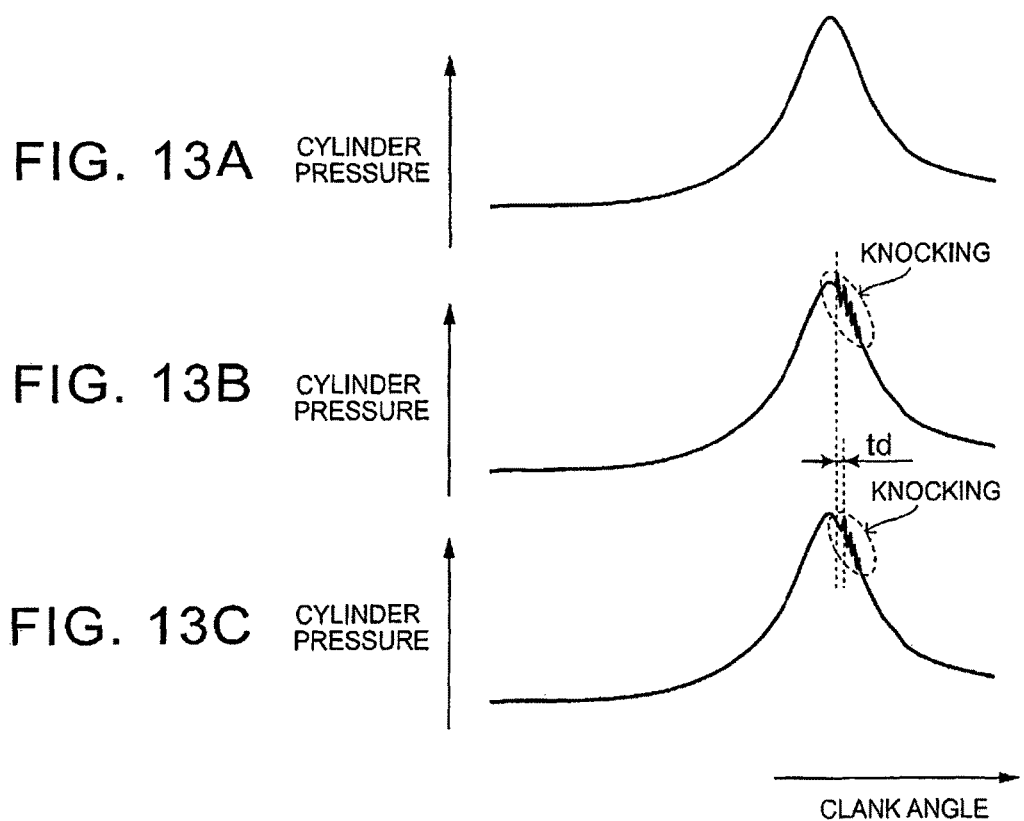
FIGS. 13A, 13B, and 13C are diagrams showing signal waveforms of "an intake valve side cylinder pressure sensor and an exhaust valve side cylinder pressure sensor" shown in FIG. 1.

A method for identifying the occurring position of the knocking is described. FIG. 13A shows the cylinder pressure in a case where the knocking is not occurring, whereas FIGS. 13B and 13C show the cylinder pressure in cases where the knocking is occurring. As is apparent from the figures, the knocking occurs when the cylinder pressure is dropping after the cylinder pressure reaches a peak, and the cylinder pressure is fluctuated by the knocking.

When the knocking occurs on the intake valve side, the fluctuation of the cylinder pressure is detected earlier by the intake valve side cylinder pressure sensor 45 than exhaust valve side cylinder pressure sensor 46. Specifically, when the knocking occurs on the intake valve side, the cylinder pressure (intake valve side cylinder pressure CPIn) detected by the intake valve side cylinder pressure sensor 45 corresponds to the waveform shown in FIG. 13B, and the cylinder pressure (exhaust valve side cylinder pressure CPEx) detected by the exhaust valve side cylinder pressure sensor 46 corresponds to the waveform shown in FIG. 13C. Thus, the cylinder pressure detected by the intake valve side cylinder pressure sensor 45 starts fluctuating earlier, by time td, than the cylinder pressure detected by the exhaust valve side cylinder pressure sensor 46. When the knocking occurs on the exhaust valve side, the cylinder pressure detected by the exhaust valve side cylinder pressure sensor 46 corresponds to the waveform shown in FIG. 13B, and the cylinder pressure detected by the intake valve side cylinder pressure sensor 45 corresponds to the waveform shown in FIG. 13C. Thus, the cylinder pressure detected by the exhaust valve side cylinder pressure sensor 46 starts fluctuating earlier, by time td, than the cylinder pressure detected by the intake valve side cylinder pressure sensor 45. The CPU identifies whether the knocking is occurring on the intake valve side or the exhaust valve side, based on this condition (which one of the intake valve side cylinder pressure CPIn and the exhaust valve side cylinder pressure CPEx has started fluctuating earlier).

Then, the CPU proceeds to step 1240, and determines whether the knocking is occurring in the area on the intake valve side in the combustion chamber CC (area closer to the intake valve 16 than to the exhaust valve 17, and close to the piston crown surface 13). Upon determining that the knocking is occurring in the area on the intake valve side in the combustion chamber CC, the CPU proceeds to step 1250, and performs the intake valve side partial lift fuel injection. Then, the CPU proceeds to step 1295 and temporarily terminates the routine. As a result, a single fuel injection (main fuel injection) FLinj is performed for the predetermined cylinder through an unillustrated routine. Then, the intake valve side partial lift fuel injection PLinj is further performed for a plurality of times (which is three times in this embodiment but may be once) at timings close to the ignition timing (or the intake top dead center).

Upon determining that the knocking is occurring in the area on the exhaust valve side in the combustion chamber CC (area closer to the exhaust valve 17 than to the intake valve 16, and close to the piston crown surface 13), the CPU determines "No" in step 1240 and proceeds to step 1260 to perform the exhaust valve side partial lift fuel injection.

Then, the CPU proceeds to step 1295 and temporarily terminates the routine. As a result, a single fuel injection (main fuel injection) FLinj is performed for the predetermined cylinder through an unillustrated routine. Then, the exhaust valve side partial lift fuel injection PLinj is further performed for a plurality of times (which is three times in this embodiment, but may be once) at timings close to the intake top dead center. When the knocking is controlled by the intake valve side partial lift fuel injection or the exhaust valve side partial lift, fuel injection, the performed partial lift fuel injection is terminated (see step 1110 in FIG. 11).

Then, the CPU resumes the processing of the routine in FIG. 12 from step 1200. When it is determined that the knocking is continuing and any one of the intake valve side partial lift fuel injection and the exhaust valve side partial lift fuel injection is being performed, the CPU determines "Yes" in steps 1210 and 1220, and proceeds to steps 750 and 760 to perform the processing of retarding the ignition timing. The processing in steps 750 and 760 has already been described, and thus will not be described herein.

As described above, upon determining that the knocking is still occurring even through the intake valve side partial lift fuel injection or the exhaust valve side partial lift fuel injection is being performed, the CPU retards the ignition timing to control the knocking. The processing in steps 750 and 760 is repeated as long as the knocking continues, and the ignition timing is retarded every time.

When the processing of the routine in FIG. 12 is terminated, the CPU immediately performs an anti-knocking control termination processing shown in the flowchart in FIG. 11. The routine in FIG. 11 has already been described, and thus will not be described.

As described above, the third device performs the first fuel injection (main fuel injection, a single full lift fuel injection) before the ignition timing. The third device includes a knocking identification unit. The knocking identification unit determines whether the knocking is occurring, and identifies whether the knocking is occurring on the intake valve side or the exhaust valve side in the combustion chamber CC (step 1230 in FIG. 12). When the knocking identification unit identifies that the knocking is occurring on the intake valve side in the combustion chamber CC, the CPU determines that the anti-knocking request is in effect, and performs the "first partial lift fuel injection with the partial lift amount set to the first lift amount". Thus, the fuel spray is formed on the intake valve side in the combustion chamber CC (steps 1240 and 1250 in FIG. 12). When the knocking identification unit identifies that the knocking is occurring on the exhaust valve side in the combustion chamber CC, the CPU determines that the anti-knocking request is in effect, and performs the "second partial lift fuel injection with the partial lift amount set to the second lift amount larger than the first lift amount". Thus, the fuel spray is formed on the exhaust valve side in the combustion chamber CC (steps 1240 and 1260 in FIG. 12).

According to this aspect, the knocking occurring on the intake valve side can be immediately controlled by the first partial lift fuel injection (intake valve side partial lift fuel injection). The knocking occurring on the exhaust valve side can be immediately controlled by the second partial lift fuel injection (exhaust valve side partial lift fuel injection).

Whether the knocking is occurring on the intake valve side or on the exhaust valve side can also be identified based on signals from an ion probe disposed on each of the intake valve side and the exhaust valve side, for example. The signal from the ion probe rises when the flame reaches the ion probe. Thus, when the knocking is detected, the CPU can identify that the knocking is occurring on the intake side, when the signal from the ion probe disposed on the exhaust side rises earlier than the signal from the ion probe on the intake side. When the knocking is detected, the CPU can identify that the knocking is occurring on the exhaust side, when the signal from the ion probe disposed on the intake side rises earlier than the signal from the ion probe on the exhaust side.

When the intake valve side cylinder pressure sensor 45 and the exhaust valve side cylinder pressure sensor 46 are provided, the knocking sensor 47 can be omitted. In step 1210 in FIG. 12, the CPU may determine whether the knocking is occurring based on the cylinder pressure of any one of the intake valve side cylinder pressure sensor 45 and the exhaust valve side cylinder pressure sensor 46.

(Fourth Embodiment)

The first to the third devices determine that the request to control the knocking (anti-knocking request) is in effect, upon determining that the knocking is occurring based on the signal from the knocking sensor 47. In contrast, an engine controller (hereinafter, also referred to as "fourth device") according to a fourth embodiment of the invention determines that the anti-knocking request is in effect upon determining that an operation state (an operation state determined by the load and the engine rotation speed NE of the engine 10 for example) is within a predetermined anti-knocking operation region.

Figure 14:
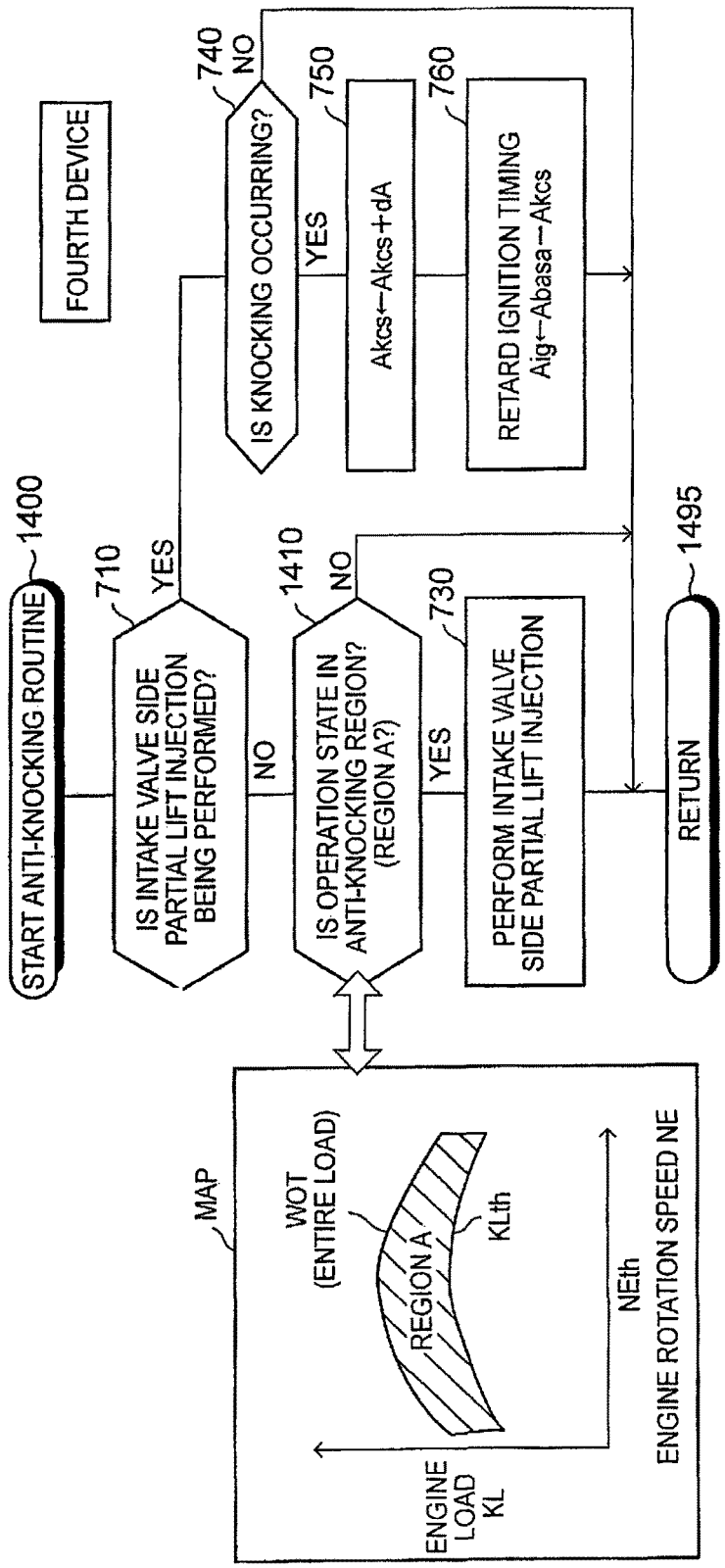
FIG. 14 is a flowchart showing a routine performed by a CPU of an engine controller (fourth device) according to a fourth embodiment of the invention.

More specifically, the CPU of the electronic control unit 30 of the fourth device performs processing of an anti-knocking routine, shown in a flowchart in FIG. 14, for any cylinder, every time a clank angle of the cylinder matches an intake top dead center. The routine in FIG. 14 is only different from the routine in FIG. 7, in that step 720 in FIG. 7 is replaced with step 1410. Specifically, the CPU proceeds to step 1410 from step 710 when the intake valve side partial lift fuel injection is not being performed. In step 1410, the CPU determines whether the engine operation state determined by the engine load (for example, the air charging amount in the cylinder, the accelerator pedal depression amount Accp, and a throttle valve opening position) and the engine rotation speed NE, is within the anti-knocking operation region. The anti-knocking operation region is a region (that is, a region A) with an engine load KL larger than a load threshold KLth, as shown in a map in FIG. 14.

When the current operation state is outside the anti-knocking operation region, the CPU determines "No" in step 1410, and directly proceeds to step 1495 to temporarily terminate the routine, without performing the intake valve side partial lift fuel injection. When the current operation state is within the anti-knocking operation region, the CPU determines "Yes" in step 1410, and proceeds to step 730 to perform the intake valve side partial lift fuel injection. Then, the CPU proceeds to step 1495 to temporarily terminate the routine. Generally, the knocking has a higher chance to occur on the intake valve side as described above. Thus, generally, the knocking is controlled by the intake valve side partial lift fuel injection PLinj.

Then, the CPU resumes the processing of the routine in FIG. 14, from step 1400. Here, the intake valve side partial lift fuel injection is being performed, and thus the CPU determines "Yes" in step 710, and proceeds to step 740 to determine whether the knocking is occurring. When the knocking is not occurring, the CPU determines "No" in step 740, and proceeds directly to step 1495 to temporarily terminate the routine. When the knocking is controlled by the intake valve side partial lift fuel injection as described above, the intake valve side partial lift fuel injection is terminated (see step 980 in FIG. 9 described later).

When the knocking is occurring even though the intake valve side partial lift fuel injection is being performed, the CPU determines "Yes" in step 740, and proceeds to steps 750 and 760 to perform processing of retarding the ignition timing.

The CPU performs "the anti-knocking control termination routine in FIG. 9 without steps 970 and 980" right after the processing of the routine in FIG. 14 is terminated. The routine in FIG. 9 has already been described, and thus will not be described herein.

As described above, the fourth device determines that the anti-knocking request is in effect upon determining that an operation state is "a predetermined operation state where the knocking needs to be controlled (that is, when the operation state of the engine 10 is within the anti-knocking operation region)". Thus, the CPU performs the first fuel injection (main fuel injection, a single full lift fuel injection) before the ignition timing, and then performs the intake valve side partial lift fuel injection. All things considered, the knocking can be controlled by the intake valve side partial lift fuel injection. In the fourth device, the load threshold KLth can be changed to be lower (that is, the region A may be enlarged) as the temperature (for example, the coolant temperature) in the engine 10 rises.

(Fifth Embodiment)

The third device described above determines that the request to control the knocking is in effect upon determining that the knocking is occurring. Furthermore, the third device identifies the occurring position of the knocking, and performs "any one of the intake valve side partial lift fuel injection and the exhaust valve side partial lift fuel injection" in accordance with the identified knocking occurring position. In contrast, an engine controller (hereinafter, also referred to as "fifth device") according to a fifth embodiment of the invention determines that the request to control the knocking is in effect upon determining that an operation state of the engine 10 (an operation state determined by the load and the engine rotation speed NE of the engine 10 for example) is within a range where the knocking on the intake valve side needs to be controlled, and performs the intake valve side partial lift fuel injection. Furthermore, the fifth device determines that the request to control the knocking is in effect when the operation state of the engine 10 is within a range where the knocking on the exhaust valve side needs to be controlled, and performs the exhaust valve side partial lift fuel injection.

Figure 15:
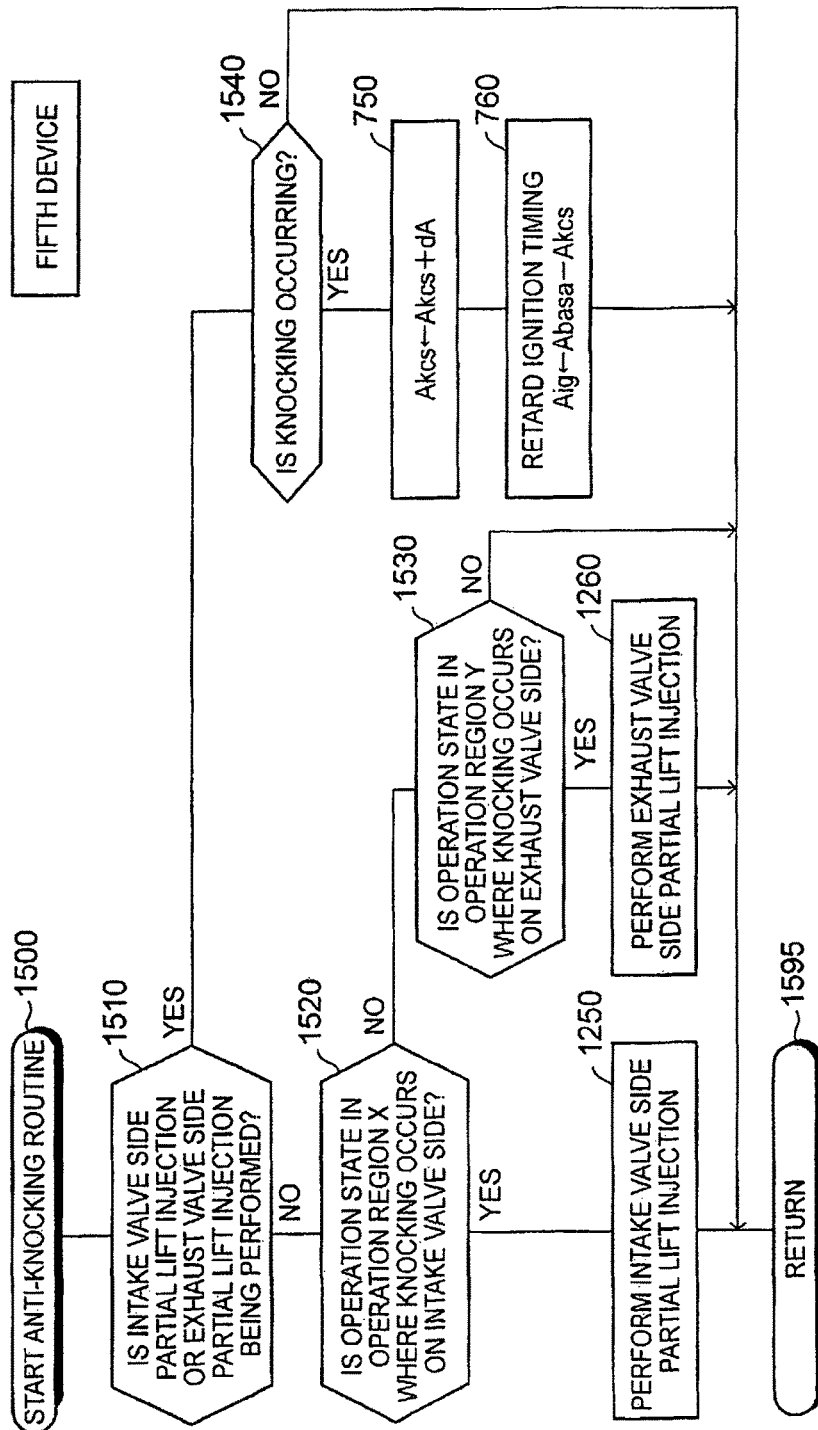
FIG. 15 is a flowchart showing a routine performed by a CPU of an engine controller (fifth device) according to a fifth embodiment of the invention.

More specifically, the CPU of the electronic control unit 30 of the fifth device performs processing of an anti-knocking routine, shown in a flowchart in FIG. 15, for any cylinder, every time a clank angle of the cylinder matches an intake top dead center.

Thus, when the clank angle of a certain cylinder (hereinafter, referred to as "predetermined cylinder" for convenience) matches the intake top dead center of the predetermined cylinder, the CPU starts the processing in step 1500 in FIG. 15. Then, the CPU proceeds to step 1510 and determines whether "any one of the intake valve side partial lift fuel injection and the exhaust valve side partial lift fuel injection is being performed for the predetermined cylinder" at the current time point.

Figure 16:
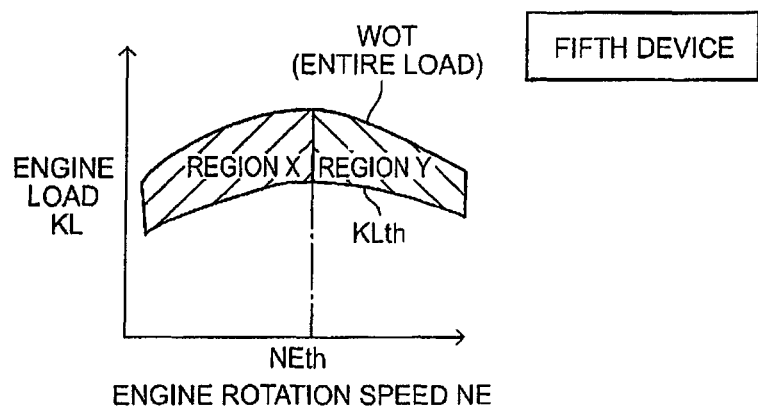
FIG. 16 is a diagram showing an operation range map referred to by the CPU of the fifth device.

When neither the intake valve side partial lift fuel injection nor the exhaust valve side partial lift fuel injection is performed, the CPU determines "No" in step 1510, and proceeds to step 1520. In step 1520, the CPU determines whether the engine operation state is within the "an operation region X where the knocking on the intake valve side needs to be controlled". As shown in FIG. 16, the operation region X is a region with the engine load KL larger than the load threshold KLth, and the engine rotation speed NE lower than the rotation speed threshold NEth (thus is a low rotation-high load region).

When the current operation state is within the operation region X, the CPU determines "Yes" in step 1520 and proceeds to step 1250 to perform the intake valve side partial lift fuel injection. Then, the CPU proceeds to step 1595 and temporarily terminates the routine.

When the operation state is out of the operation region X at the point where the CPU performs the processing in step 1520, the CPU determines "No" in step 1520 and proceeds to step 1530 to determine whether the operation state is within "an operation region Y where the knocking on the exhaust valve side needs to be controlled". As shown in FIG. 16, the operation region Y is a region with the engine load KL larger than the load threshold KLth, and the engine rotation speed NE higher than the rotation speed threshold NEth (thus is a high rotation-high load region). The operation region X and the operation region Y may be switched depending on the engine.

When the current operation state is within the operation region Y, the CPU determines "Yes" in step 1530 and proceeds to step 1260 to perform the exhaust valve side partial lift fuel injection. Then, the CPU proceeds to step 1595 and temporarily terminates the routine.

When the operation state is out of the operation region Y at the point where the CPU performs the processing in step 1530, the CPU determines "No" in step 1530, and directly proceeds to step 1595 to temporarily terminate the routine. In this case, neither "the intake valve side partial lift fuel injection nor the exhaust valve side partial lift fuel injection" is performed for the predetermined cylinder.

When any one of the intake valve side partial lift fuel injection and the exhaust valve side partial lift fuel injection is being performed, the CPU determines "Yes" upon proceeding to step 1510. Then, the CPU proceeds to step 1540 and determines whether the knocking is occurring in the predetermined cylinder.

When the knocking is occurring at this point, the CPU determines "Yes" in step 1540, and proceeds to steps 750 and 760 to perform the processing of retarding the ignition timing. The processing in steps 750 and 760 has already been described, and thus will not be described herein.

The CPU performs "the anti-knocking control termination routine in FIG. 11 without steps 970 and 1110" right after the processing of the routine in FIG. 15 is terminated. The routine in FIG. 11 has already been described, and thus will not be described herein.

As described above, the fifth device performs the first fuel injection (main fuel injection, a single full lift fuel injection) before the ignition timing. The fifth device further performs the following operations. Specifically, (1) when the operation state of the engine 10 is the first predetermined operation state where the knocking on the intake valve side in the combustion chamber CC needs to be controlled (that is, when the operation state of the engine 10 is within the operation region X in FIG. 16), the CPU determines that the anti-knocking request is in effect, and performs "the first partial lift fuel injection (intake valve side partial lift fuel injection) with the partial lift amount set to the first lift amount". Thus, the fuel spray is formed on the intake valve side in the combustion chamber CC. (2) When the operation state of the engine 10 is the second predetermined operation state where the knocking on the exhaust valve side in the combustion chamber CC needs to be controlled (that is, when the operation state of the engine 10 is within the operation region Y in FIG. 16), the CPU determines that the anti-knocking request is in effect, and performs "the second partial lift fuel injection (exhaust valve side partial lift fuel injection) with the partial lift amount set to the second lift amount larger than the first lift amount". Thus, the fuel spray is formed on the exhaust valve side in the combustion chamber CC.

Thus, the knocking on the intake valve side can be controlled by the first partial lift fuel injection, and the knocking on the exhaust valve side can be controlled by the second partial lift fuel injection.

As described above, the engine controller according to each embodiment can effectively control the knocking without largely retarding the ignition timing by appropriately using the partial lift fuel injection.

Figure 17:
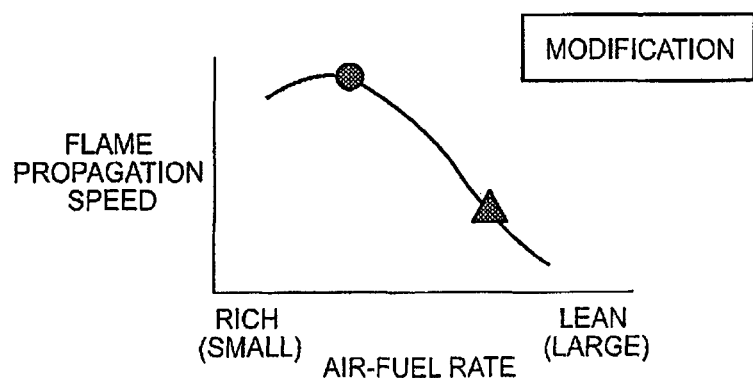
FIG. 17 is a graph showing a relationship between an air-fuel ratio of an air-fuel mixture and a flame propagation speed.
Figure 18A:
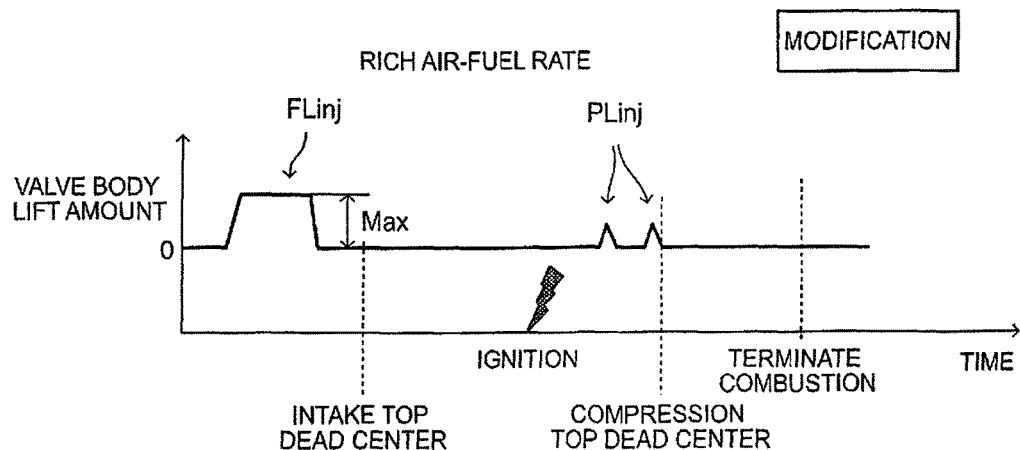
Figure 18B:
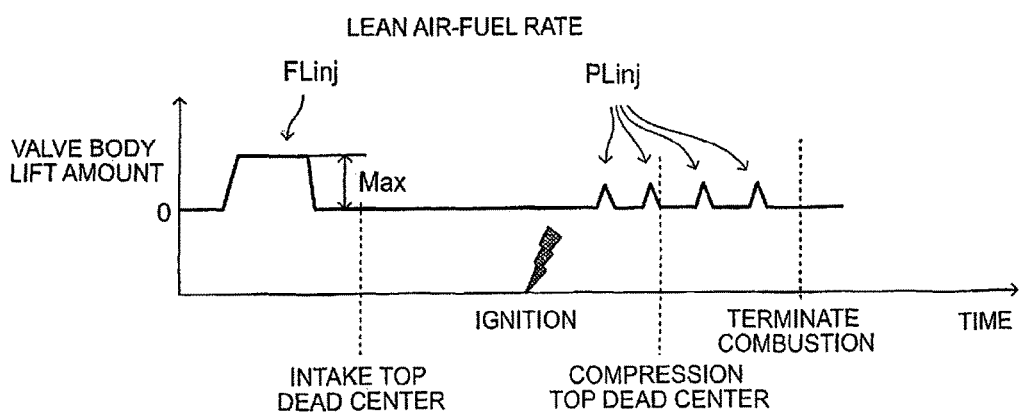

The invention is not limited to the embodiments described above, and various modifications can be made within the scope of the invention. For example, as illustrated in FIG. 17, the flame propagation speed decreases as the air-fuel ratio of the air-fuel mixture increases (air-fuel mixture becomes leaner). Thus, the knocking has a higher chance to occur with a larger air-fuel ratio of the air-fuel mixture. Thus, as shown in FIGS. 18A and 18B, when a condition for performing the partial lift fuel injection (the intake valve side partial lift fuel injection and the exhaust valve side partial lift fuel injection) is satisfied, the devices according to the embodiments may increase the number of times the injection is performed, as the air-fuel ratio of the air-fuel mixture increases. The air-fuel ratio of the air-fuel mixture may be acquired based on a set target air-fuel ratio, or may be detected by an air-fuel ratio sensor disposed in an exhaust gas passage.

The engine controller according to each embodiment of the invention may also be applied to an internal combustion engine including an intake port fuel injection valve that injects the fuel into the intake port, in addition to the direct injection valve such as the fuel injection valve 20.

Furthermore, the number of times the partial lift fuel injection (intake valve side partial lift fuel injection and the exhaust valve side partial lift fuel injection) is performed may be increased as the level of the knocking (frequency of the knocking and/or the intensity of the knocking) rises. Furthermore, the number of times the first fuel injection (main fuel injection, a single full lift fuel injection) is performed is not particularly limited to once, and may be performed by the partial lift fuel injection. In addition to the intake valve side partial lift fuel injection or the exhaust valve side partial lift fuel injection, another partial lift fuel injection can be performed at and after the middle stage of expansion stroke, to assist the warming up of the engine, for example. Whether the knocking is occurring can be determined based on a signal from a sensor (for example, a cylinder pressure sensor) other than the knocking sensor.

In the above description, the engine 10 is configured to generate the tumble flow. Alternatively, the tumble flow may not be generated, or swirl flow may be generated instead of the tumble flow.

Furthermore, the engine controller according to each embodiment retards the ignition timing when the knocking cannot be controlled by the partial lift fuel injection. Alternatively, the partial lift fuel injection and the retarding of the ignition timing may be performed at once when the anti-knocking request is in effect, or the ignition timing may not be retarded. The level of the knocking at which the partial lift fuel injection is terminated may be set to be smaller than the level of the knocking at which the partial lift fuel injection Is started.

The shape and the number of the fuel injection hole 21 of the fuel injection valve 20 is not particularly limited, as long as the fuel spray can be formed at a desired position in the combustion chamber CC by the partial lift fuel injection. Specifically, the shape of the fuel injection hole 21, which is a flat slit shape in the description above, may be a cylindrical shape or a slit with a cross section in a shape of a cross. Furthermore, a plurality of injection holes 21 may be provided for a single fuel injection valve 20.

In the description above, when the partial lift fuel injection is performed, the fuel injection amount of the full lift fuel injection (main fuel injection) performed right before the partial lift fuel injection is subtracted by the fuel injection amount of the partial lift fuel injection. Alternatively, the partial lift fuel injection may be additionally performed without reducing the fuel injection amount of the full lift injection. Furthermore, the timing of performing the partial lift fuel injection for controlling the knocking may be advanced and retarded from the ignition timing. In an engine, in which the knocking is more likely to occur on the exhaust valve side than on the intake valve side, the exhaust valve side partial lift fuel injection may be performed in step 730 in FIG. 7 or FIG. 14. Similarly, for example, in the engine, in which the knocking is more likely to occur on the exhaust valve side than on the intake valve side, steps 1015 and 1035 may be swapped. In response to this, other steps in FIG. 10 (for example, steps 1020 and 1030) may be changed as appropriate.

The invention claimed is:

1. An engine controller for a spark-ignition internal combustion engine, the spark-ignition internal combustion engine including:
   a fuel injection valve including a valve body configured to close a fuel injection hole when the valve body is at a sitting position, the fuel injection valve configured to change a lift amount, which is a movement amount of the valve body from the sitting position, within a range up to a maximum lift amount; and
   a cylinder defining a combustion chamber opened and closed by an intake valve and an exhaust valve, the cylinder being provided with the fuel injection valve that directly injects fuel into the combustion chamber, wherein
   the fuel injection valve is provided such that the fuel is directly injected into the combustion chamber toward an exhaust valve side from an intake valve side,
   the engine controller comprising:
   an electronic control unit configured to perform a first fuel injection with the maximum lift amount from the fuel injection valve before an ignition timing by changing the lift amount, wherein
   the electronic control unit is configured to determine whether a request to control knocking is in effect,
   the electronic control unit is configured to detect knocking and determine that the request is in effect when the knocking is detected,
   the electronic control unit is configured to perform partial lift fuel injection by changing the lift amount to a partial lift amount lower than the maximum lift amount at a predetermined timing close to the ignition timing after the first fuel injection performed before the ignition timing, when the request is in effect,
   the electronic control unit is configured to perform, as the partial lift fuel injection, first partial lift fuel injection with the partial lift amount set to a first lift amount such that the fuel is injected to the intake valve side in the combustion chamber, when the request is in effect, and the electronic control unit is configured to perform, as the partial lift fuel injection, second partial lift fuel injection with the partial lift amount set to a second lift amount that is larger than the first lift amount such that the fuel is injected to the exhaust valve side in the combustion chamber, when the knocking is detected while the first partial lift fuel injection is performed.

2. The engine controller according to claim 1, wherein the electronic control unit is configured to perform the partial lift fuel injection consecutively for a plurality of times in a combustion cycle at a timing close to the ignition timing, when the request is in effect.

3. The engine controller according to claim 1, wherein the electronic control unit is configured to identify whether the knocking occurs on the intake valve side or on the exhaust valve side in the combustion chamber, the electronic control unit is configured to perform, as the partial lift fuel injection, the first partial lift fuel injection with the partial lift amount set to the first lift amount such that the fuel is injected to the intake valve side in the combustion chamber, when the knocking occurs on the intake valve side in the combustion chamber, and the electronic control unit is configured to perform, as the partial lift fuel injection, the second partial lift fuel injection with the partial lift amount set to the second lift amount that is larger than the first lift amount, when the knocking occurs on the exhaust valve side in the combustion chamber.

4. The engine controller according to claim 1, wherein the electronic control unit is configured to determine that the request is in effect when an operation state of the engine is a predetermined operation state where knocking needs to be controlled.

5. The engine controller according to claim 1, wherein the electronic control unit is configured to perform, as the partial lift fuel injection, the first partial lift fuel injection with the partial lift amount set to the first lift amount such that the fuel is injected to the intake valve side in the combustion chamber, when an operation state of the engine is a first predetermined operation state in which knocking needs to be controlled on the intake valve side in the combustion chamber, and the electronic control unit is configured to perform, as the partial lift fuel injection, the second partial lift fuel injection with the partial lift amount set to the second lift amount that is larger than the first lift amount such that the fuel is injected to the exhaust valve side in the combustion chamber, when the operation state of the engine is a second predetermined operation state in which knocking needs to be controlled on the exhaust valve side in the combustion chamber.

6. An engine controller for a spark-ignition internal combustion engine, the spark-ignition internal combustion engine including:

a fuel injection valve including a valve body configured to close a fuel injection hole when the valve body is at a sitting position, the fuel injection valve configured to change a lift amount, which is a movement amount of the valve body from the sitting position, within a range up to a maximum lift amount; and a cylinder defining a combustion chamber opened and closed by an intake valve and an exhaust valve, the cylinder being provided with the fuel injection valve that directly injects fuel into the combustion chamber, the engine controller comprising:

an electronic control unit configured to perform a first fuel injection with the maximum lift amount from the fuel injection valve before an ignition timing by changing the lift amount, wherein the electronic control unit is configured to determine whether a request to control knocking is in effect, the electronic control unit is configured to perform partial lift fuel injection by changing the lift amount to a partial lift amount lower than the maximum lift amount at a predetermined timing close to the ignition timing after the first fuel injection performed before the ignition timing, when the request is in effect, and the electronic control unit is configured to increase the number of times that the partial lift fuel injection is performed at a timing close to the ignition timing, as an air-fuel ratio of an air-fuel mixture supplied to the engine increases.

7. The engine controller according to claim 1, wherein the electronic control unit is configured to retard the ignition timing when the knocking is detected while the second partial lift fuel injection is performed.

8. An engine controller for a spark-ignition internal combustion engine, the spark-ignition internal combustion engine including:

a fuel injection valve including a valve body configured to close a fuel injection hole when the valve body is at a sitting position, the fuel injection valve configured to change a lift amount, which is a movement amount of the valve body from the sitting position, within a range up to a maximum lift amount; and a cylinder defining a combustion chamber opened and closed by an intake valve and an exhaust valve, the cylinder being provided with the fuel injection valve that directly injects fuel into the combustion chamber, the engine controller comprising:

an electronic control unit configured to perform a first fuel injection with the maximum lift amount from the fuel injection valve before an ignition timing by changing the lift amount, wherein the electronic control unit is configured to determine whether a request to control knocking is in effect, the electronic control unit is configured to perform partial lift fuel injection by changing the lift amount to a partial lift amount lower than the maximum lift amount at a predetermined timing close to the ignition timing after the first fuel injection performed before the ignition timing, when the request is in effect, the electronic control unit is configured to determine a target fuel injection amount based on a predetermined air-fuel ratio, the target fuel injection amount being the amount of fuel injected by a fuel injection valve in a single combustion cycle of the spark-ignition internal combustion engine, the electronic control unit is configured to, when the request to control knocking is not in effect, perform the first fuel injection using the target fuel injection amount, and the electronic control unit is configured to, when the request to control knocking is in effect, perform the first fuel injection using a fuel injection amount which is obtained by subtracting a fuel injection amount of the partial lift fuel injection from the target fuel injection amount.

* * * * *